US010818901B2

(12) United States Patent
Kim et al.

(10) Patent No.: US 10,818,901 B2
(45) Date of Patent: Oct. 27, 2020

(54) LAMINATED CELL AND METHOD FOR MANUFACTURING SAME

(75) Inventors: Taewon Kim, Yokohama (JP); Kazumi Hisajima, Yamato (JP)

(73) Assignee: ENVISION AESC JAPAN LTD., Zama-shi (JP)

(*) Notice: Subject to any disclaimer, the term of this patent is extended or adjusted under 35 U.S.C. 154(b) by 132 days.

(21) Appl. No.: 14/127,254

(22) PCT Filed: Mar. 19, 2012

(86) PCT No.: PCT/JP2012/057023
§ 371 (c)(1),
(2), (4) Date: Dec. 18, 2013

(87) PCT Pub. No.: WO2012/176517
PCT Pub. Date: Dec. 27, 2012

(65) Prior Publication Data
US 2014/0120408 A1     May 1, 2014

(30) Foreign Application Priority Data

Jun. 21, 2011 (JP) ................................. 2011-137704
Feb. 22, 2012 (JP) ................................. 2012-036530

(51) Int. Cl.
*H01M 2/16*     (2006.01)
*H01M 10/04*     (2006.01)

(52) U.S. Cl.
CPC ..... *H01M 2/1673* (2013.01); *H01M 10/0436* (2013.01); *Y10T 156/10* (2015.01)

(58) Field of Classification Search
None
See application file for complete search history.

(56) References Cited

U.S. PATENT DOCUMENTS 5,981,107 A * 11/1999 Hamano ................. H01M 4/04
                                                         429/231.95
6,537,705 B1    3/2003   Hamano et al.
6,632,538 B1 * 10/2003   Yamazaki ............. H01M 2/021
                                                         428/213

(Continued)

FOREIGN PATENT DOCUMENTS

DE       10 2009 013 345 A1    9/2010
DE         102009013345 A1 * 9/2010 .......... H01M 2/1673

(Continued)

OTHER PUBLICATIONS

European Extended Search Report, dated Nov. 4, 2014, 5 pages.

*Primary Examiner* — Zhongqing Wei
(74) *Attorney, Agent, or Firm* — Foley & Lardner LLP

(57) ABSTRACT

A laminated cell (100) of the present invention includes a laminated body (120) formed by sequential stacking a negative electrode (130), a separator (170, 180), a positive electrode (150), and a separator (170, 180). At least one of surfaces of the positive electrode (150) or the negative electrode (130) in a stacking direction (S) has a portion to which a resin member (190) is bonded. The separators each have a portion bonded to the resin member (190) on a side facing the at least one of surfaces. In the present invention, since the separators and at least one of the positive electrode and the negative electrode are integrated together, misalignment in a stacking work can be easily suppressed and the laminated cell has excellent productivity.

17 Claims, 25 Drawing Sheets

(56) References Cited

U.S. PATENT DOCUMENTS

| | | |
|---|---|---|
| 7,258,948 B2 | 8/2007 | Miyamoto et al. |
| 7,811,696 B2 | 10/2010 | Fujikawa et al. |
| 7,951,492 B2 | 5/2011 | Kim et al. |
| 8,349,484 B2 | 1/2013 | Do et al. |
| 2004/0202928 A1 | 10/2004 | Miyamoto et al. |
| 2005/0284750 A1* | 12/2005 | Nishimura ............... H01M 2/34 204/252 |
| 2006/0127774 A1 | 6/2006 | Kim et al. |
| 2008/0199781 A1* | 8/2008 | Lunt .................... H01M 2/1646 429/246 |
| 2010/0164885 A1* | 7/2010 | Hosorogi ............... G06F 3/0412 345/173 |
| 2010/0175245 A1 | 7/2010 | Do et al. |
| 2011/0135996 A1* | 6/2011 | Ahn ...................... H01M 2/145 429/162 |
| 2012/0189895 A1* | 7/2012 | Gutsch ................ H01M 2/1673 429/144 |

FOREIGN PATENT DOCUMENTS

| | | |
|---|---|---|
| JP | 2-186568 A | 7/1990 |
| JP | 7-302616 A | 11/1995 |
| JP | 2004-158344 A | 6/2004 |
| JP | 2006-196248 A | 7/2006 |
| JP | 2007-103356 A | 4/2007 |
| JP | 2010-529617 A | 8/2010 |
| KR | 10-2004-0076831 A | 9/2004 |
| KR | 10-2006-0037847 A | 5/2006 |
| KR | 10-2008-0106678 A | 12/2008 |
| WO | WO 99/33136 A1 | 7/1999 |
| WO | WO 2008/150070 A1 | 12/2008 |
| WO | WO 2008150070 A1 * | 12/2008 .......... H01M 10/052 |

\* cited by examiner

LAMINATED CELL AND METHOD FOR MANUFACTURING SAME

TECHNICAL FIELD

The present invention relates to a laminated cell and a method for manufacturing the same.

BACKGROUND ART

A laminated cell has a laminated body formed by sequentially stacking a positive electrode, a separator, a negative electrode, and a separator. Misalignment in stacking may cause short circuit, reduction of the cell capacity due to reduction in the effective power generation area, and other defects. Thus, the misalignment in stacking is conventionally suppressed by disposing the positive electrode in a bag-shaped separator (see Patent Literature 1, for example).

CITATION LIST

Patent Literature

Patent Literature 1: Japanese Patent Application Publication No. Hei 7-302616

SUMMARY OF INVENTION

However, in order to position the positive electrode inside the hag-shaped separator, four portions of the bag-shaped separator which correspond to four end surfaces of the positive electrode are the ally fused and bonded. Accordingly, the conventional technique has a problem that the number of work steps is large and improvement in productivity is difficult. Moreover, since the thermal fusion bonding may cause the thickness of the bag-shaped separator to decrease and thereby cause defects such as holes, a certain interval needs to be secured between an outer peripheral portion of the positive electrode and the thermal fusion bonding portion. Accordingly, the conventional technique has a problem that size reduction of the cell through size reduction of the bag-shaped separator is difficult to achieve.

The present invention has been made in view of such problems of the conventional technique. An object of the present invention is to provide a laminated cell which has excellent productivity and which can be easily reduced in size, and a manufacturing method for the same.

A laminated cell in a first aspect of the present invention includes a laminated body formed by sequentially stacking a negative electrode, a separator, a positive electrode, and a separator. At least one of surfaces of the positive electrode or the negative electrode in a stacking direction has a portion to which a resin member is bonded, and the separators each has a portion bonded to the resin member on a side facing the at least one of surfaces.

A method for manufacturing a laminated cell having a laminated body formed by sequentially stacking a negative electrode, a separator, a positive electrode, and a separator in a second aspect of the present invention includes the step of bonding a portion of each of the separators on a side facing at least one of surfaces of the positive electrode or the negative electrode in a stacking direction to a resin member bonded to a portion in the at least one of surfaces.

DESCRIPTION OF EMBODIMENTS

Figure 1:
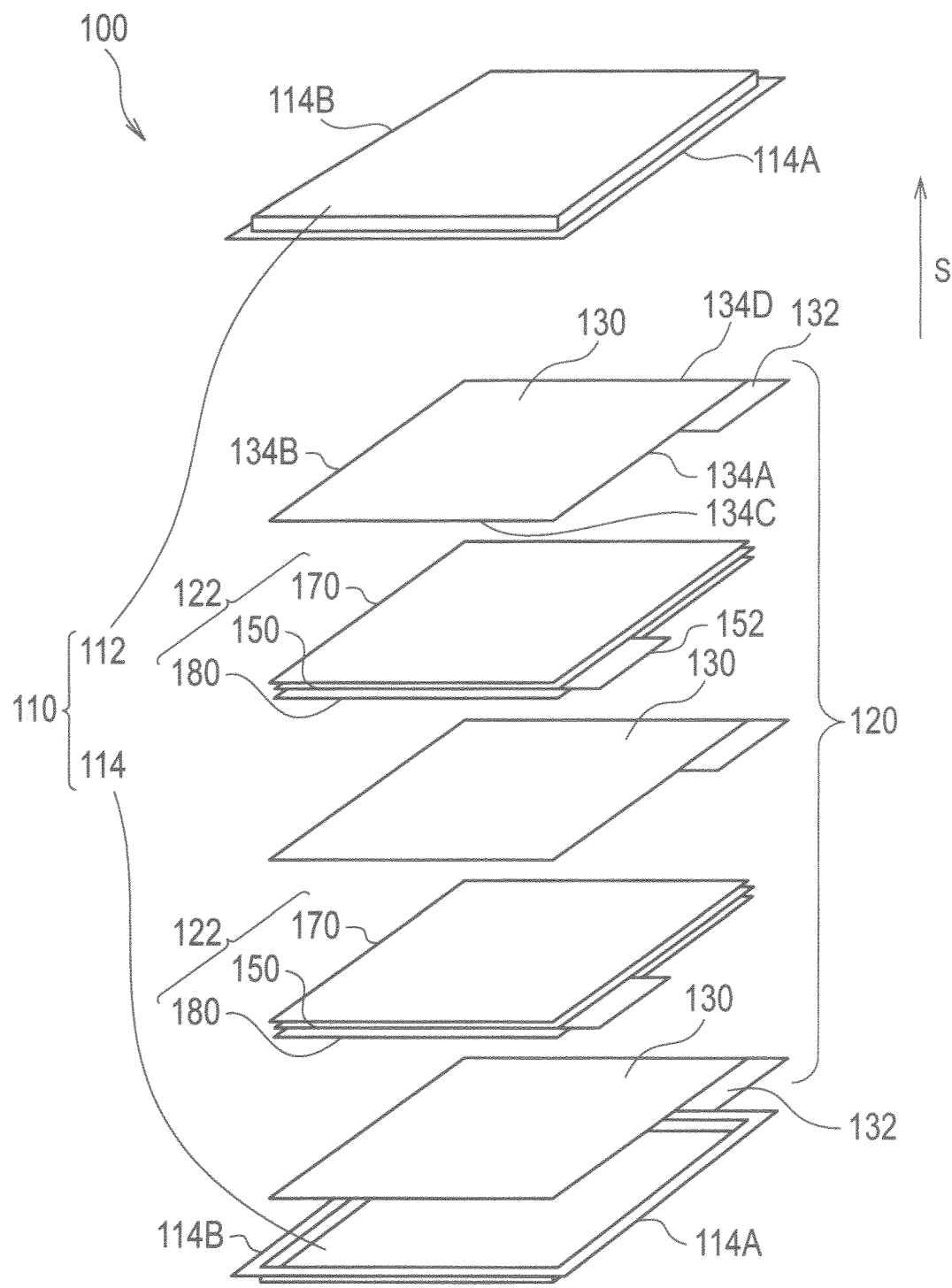
FIG. 1 is exploded perspective view for explaining a laminated cell in a first embodiment.

Embodiments of the present invention are described below based on the drawings. Note that proportions of dimensions in the drawings may be exaggerated for the sake of description and be different from the actual proportions.

First Embodiment

Figure 2:
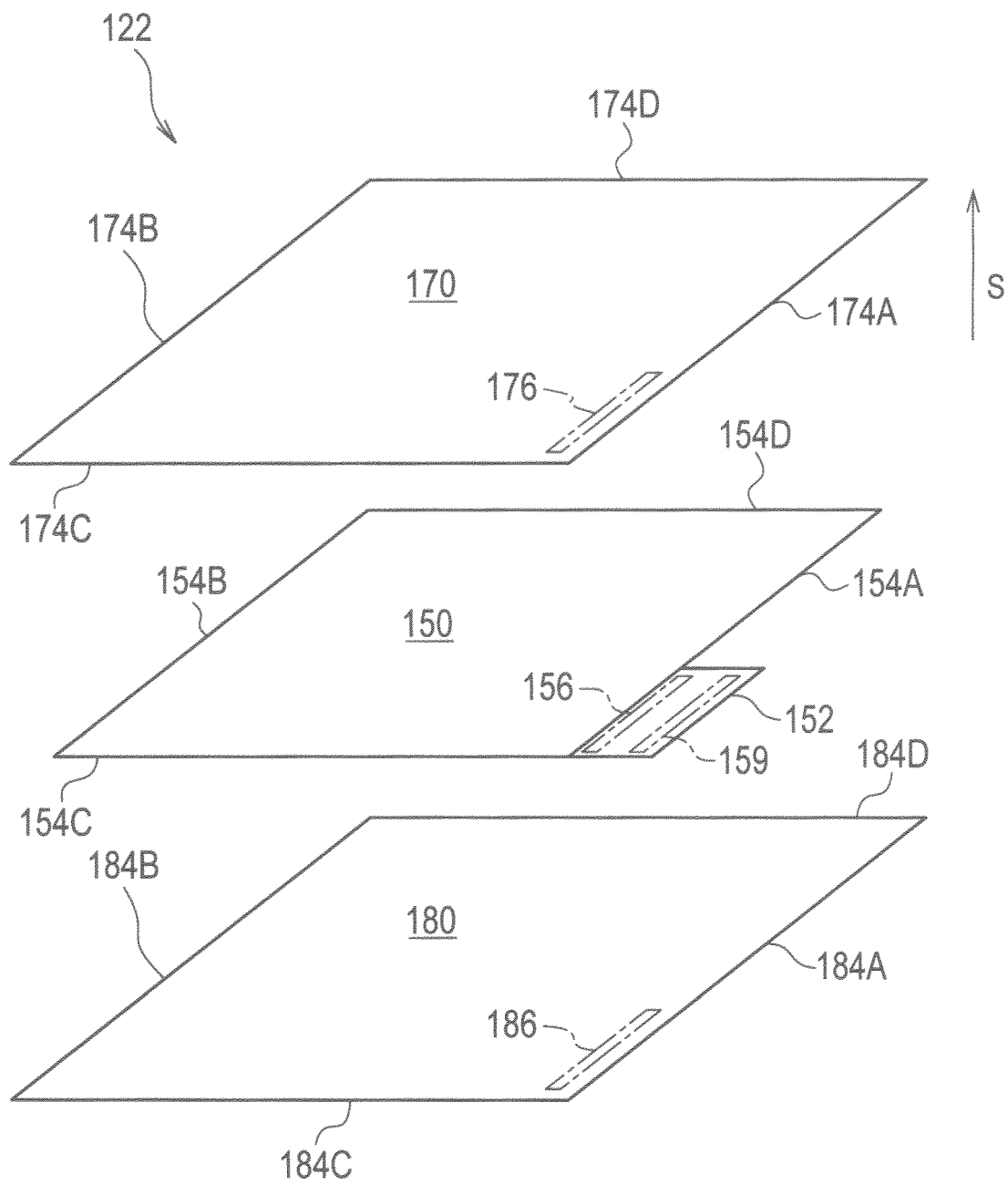
FIG. 2 is an exploded perspective view for explaining a sub-assembly shown in FIG. 1.
Figure 3:
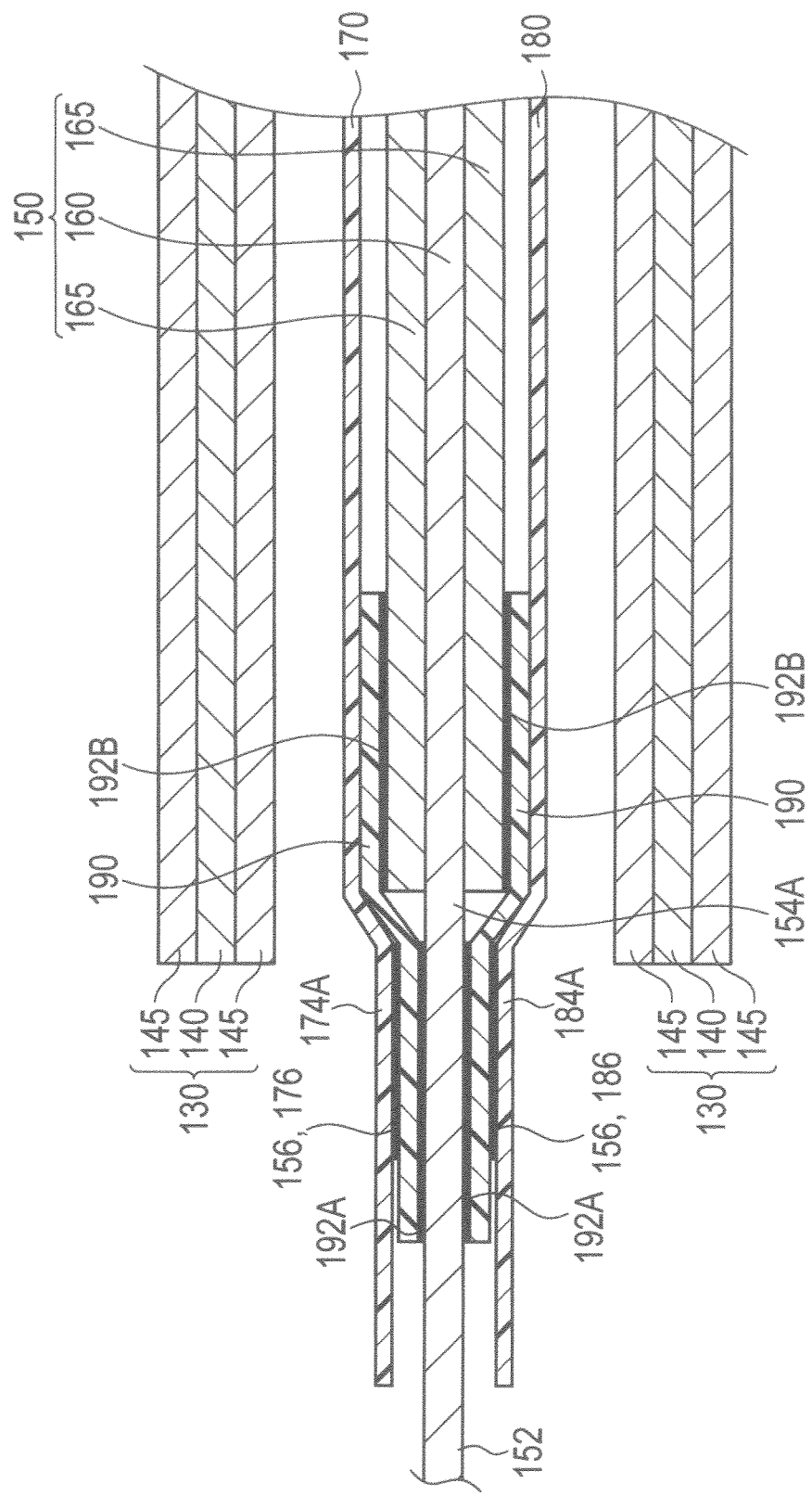
FIG. 3 is a cross-sectional view for explaining a front portion of the sub-assembly shown in FIG. 1.
Figure 4:
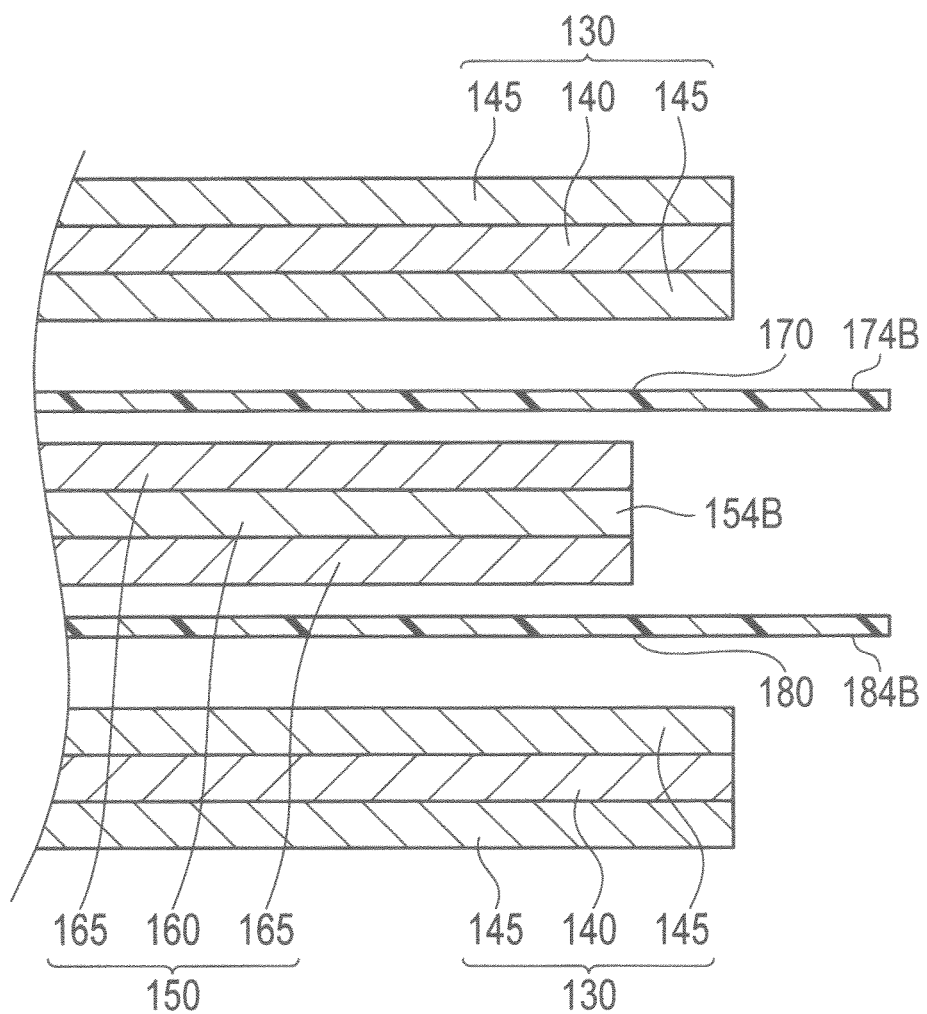
FIG. 4 is a cross-sectional view for explaining a rear portion of the sub-assembly shown in FIG. 1.

FIG. 1 is an exploded perspective view for explaining a laminated cell in a first embodiment and FIG. 2 is an exploded perspective view for explaining a sub-assembly shown in FIG. 1. Moreover, FIGS. 3 and 4 are cross-sectional views respectively for explaining a front portion and a rear portion of the sub-assembly shown in FIG. 1.

A laminated cell 100 in the first embodiment is formed of, for example, a substantially-rectangular lithium-ion secondary cell and has an exterior member 110 and a laminated body 120 forming a cell main body.

The exterior member 110 is formed of an upper portion 112 and a lower portion 114 and is used to prevent shock from the outside and deterioration due to an environment. Outer peripheral portions of sheet members forming the upper portion 112 and the lower portion 114 are partially or entirely bonded to each other by thermal fusion bonding. From the view point of weight reduction and thermal conductivity, the sheet members in the exterior member 110 are preferably made of polymer-metal composite laminated film in which a metal is covered with an insulator such as a polypropylene film. A metal such as aluminum, stainless steel, nickel, or copper or an alloy of these metals can be used as the metal in the sheet members. Note that reference numerals 114A and 114B respectively denote a front edge portion and a rear edge portion of the exterior member 110.

The laminated body 120 is formed by sequentially stacking negative electrodes 130 and sub-assemblies 122. The sub-assemblies 122 each have a positive electrode 150 and separators 170, 180. The separators 170, 180 are disposed respectively on both sides of the positive electrode 150 in a stacking direction S. The number of the stacked negative electrodes 130 and the stacked sub-assemblies 122 is determined as appropriate in consideration of the required capacity and the like.

As shown in FIGS. 1 and 3, each negative electrode 130 has a substantially-rectangular shape and has a negative-electrode current collector 140 and negative-electrode active material layers 145. The negative-electrode current collector 140 is formed of a high-conductivity member and has a negative-electrode current collecting portion 132 for taking out generated electric power to the outside. The negative-electrode active material layers 145 are regions in which a negative-electrode active material is disposed, the negative-electrode active material being a material to which lithium is inserted and from which lithium is extracted. The negative-electrode active material layers 145 are disposed on both surfaces of the negative-electrode current collector 140 except for the negative-electrode current collecting portion 132 and are in contact with the negative-electrode current collector 140. An outer peripheral portion of the negative electrode 130 is formed of: a front edge portion 134A in which the negative-electrode current collecting portion 132 is disposed; a rear edge portion 134B which is opposite to the front edge portion; and side edge portions 134C, 134D which are opposite to each other and which connect the front edge portion 134A and the rear edge portion 134B to each other.

Moreover, as shown in FIGS. 2 and 3, each positive electrode 150 has a substantially-rectangular shape and has a positive-electrode current collector 160 and positive-electrode active material layers 165. The positive-electrode current collector 160 is formed of a high-conductivity member and has a positive-electrode current collecting portion 152 for taking out the generated electric power to the outside. The positive-electrode active material layers 165 are regions in which a positive-electrode active material is disposed, the positive-electrode active material being a material to which lithium is inserted and from which lithium is extracted. The positive-electrode active material layers 165 are disposed on both surfaces of the positive-electrode current collector 160 except for the positive-electrode current collecting portion 152 and are in contact with the positive-electrode current collector 160. An outer peripheral portion of the positive electrode 150 is formed of a front edge portion 154A in which the positive-electrode current collecting portion 152 is disposed; a rear edge portion 154B which is opposite to the front edge portion; and side edge portions 154C, 154D which are opposite to each other and which connect the front edge portion 154A and the rear edge portion 154B to each other. Note that reference numeral 159 denotes a bonding region of the positive-electrode current collecting portion 152 to the front edge portion 114A of the exterior member 110.

In the embodiment, as shown in FIGS. 3 and 4, the negative electrodes 130 are formed to be larger than the positive electrodes 150 in size. The negative-electrode current collecting portions 132 and the positive-electrode current collecting portions 152 extend to the outside of the cell from a space between the upper portion 112 and the lower portion 114 of the exterior member 110. Moreover, in order to secure the tightness of the exterior member 110, contact portions of the negative-electrode current collecting portions 132 and the positive-electrode current collecting portions 152 with the exterior member 110 bonded. Moreover, as shown in FIG. 1, the positions and shapes of the negative-electrode current collecting portions 132 and the positive-electrode current collecting portions 152 are set such that the negative-electrode current collecting portions 132 and the positive-electrode current collecting portions 152 do not overlap one another in the stacking direction S.

The separators 170, 180 have substantially-rectangular shapes and form electrolyte layers made of microporous sheets containing electrolyte solution. The separators 170, 180 are each disposed between an adjacent pair of the negative electrode 130 and the positive electrode 150. Moreover, as shown in FIGS. 3 and 4, the separators 170, 180 are formed to be larger than the negative-electrode active material layers 145 and the positive-electrode active material layers 165 in size. As shown in FIG. 2, outer peripheral portions of the separators 170, 180 include: front edge portions 174A, 184A adjacent to the positive-electrode current collecting portion 152 and the negative-electrode current collecting portion 132; and rear edge portions 174B, 184B opposite to the front edge portions 174A, 184A. The outer peripheral portions of the separators 170, 180 further include side edge portions 174C, 174D, 184C, 184D which are opposite to one another and which connect the front edge portions 174A, 184A and the rear edge portions 174B, 184B to one another.

Moreover, as shown in FIG. 3, in each sub-assembly 122, film-like resin members 190 are bonded to both surfaces of the positive electrode 150 in the stacking direction S. Furthermore, the front edge portions 174A, 184A of the separators 170, 180 are bonded to the resin members 190, respectively.

In other words, the electrode 150 has the front edge portion 154A whose both surfaces in the stacking direction S are bonded with the resin members 190. In the front edge portion 154A, the positive-electrode current collector 160 and one surfaces of the resin members 190 are bonded to one another in bonding regions 192A. Moreover, the positive-electrode active material layer 165 and the one surfaces of the resin members 190 are bonded to one another in bonding regions 192B. Furthermore, the separators 170, 180 have the front edge portions 174A, 184A to which the resin members 190 are bonded. In the front edge portion 174A of the separator 170, the separator 170 and the other surface of a corresponding one of the resin members 190 are bonded to each other in bonding regions 156, 176. Moreover, in the front edge portion 184A of the separator 180, the separator 180 and the other surface of a corresponding one of the resin members 190 are bonded to each other in bonding regions 156, 186.

Since the positive electrode 150 and the separators 170, 180 are integrated together via the resin members 190 as described above, misalignment in a stacking work can be easily suppressed and the 1 mated cell has excellent productivity. In other words, the positioning in the stacking work is facilitated and the workability is improved. Moreover, the front edge portion 154A (bonding regions 156) is provided on both surfaces of the positive electrode 150 while the front edge portions 174A, 184A (bonding regions 176, 186) facing the front edge portion 154A on both surfaces of the positive electrode 150 are provided in the separators 170, 180, and the positive electrode 150 and the separators 170, 180 are integrated by bonding the front edge portion 154A bonding regions 156) of the positive electrode 150 to the front edge portions 174A, 184A (bonding regions 176, 186) of the separators 170, 180. Accordingly, effects on the sizes of the negative electrode 130, the positive electrode 150, and the separators 170, 180 are small and the laminated cell 100 can be thereby easily reduced in size. Thus, it is possible to provide a laminated cell which has excellent productivity and which can be easily reduced in size, and a manufacturing method for the same.

Note that the resin members 190 have an electrically insulating characteristic and are arranged in the positive-electrode current collecting portion 152 in the embodiment. Accordingly, short circuit in the positive-electrode current collecting portion 2 can be also prevented.

The bonding method of the resin members 190 to the positive electrode 150 and the bonding method of the separators 170, 180 to the resin members 190 are not limited and methods such as thermal welding, ultrasonic welding, laser welding, induction heating welding, and an adhesive can be used as appropriate. Moreover, the mode of each of the bonding regions is not limited to a mode including a single dot-shaped region and can be a mode including multiple dot-shaped regions which are, for example, a group of dot-shaped regions spaced away from each other.

Each of the resin members 190 may be formed of, for example, a double-sided adhesive tape including: an electrically insulative base material; and an adhesive disposed on both surfaces of the base material in the stacking direction S. In this case, there is no need to, for example, dispose an adhesive or use a thermal fusion bonding device for the bonding of the positive electrode 150 and the resin members 190 and the bonding of the separators 170, 180 and the resin members 190. Accordingly, it is possible to reduce the number of work steps and improve productivity.

Examples of the base material which can be used in the resin members 190 include a resin selected from a group including polypropylene, polyethylene, and polyamide-based synthetic fiber. The base material can be made of a single layer or a laminated body in which multiple layers are stacked. Moreover, examples of the adhesive include a material which has resistance to solvent and which is selected from a group including synthetic rubbers, butyl rubber, synthetic resins, and acryl.

A carbon material and an alloy-based negative-electrode material are preferably used as the negative-electrode active material in the negative-electrode active material layers 145 of the negative electrodes 130, from the view point of capacity and output characteristics. For example, graphite, carbon black, activated carbon, carbon fiber, coke, soft carbon, and hard carbon are preferably used as the carbon material. A lithium-transition metal complex oxide is preferably used as the positive-electrode active material in the positive-electrode active material layers 165 of the positive electrodes 150, from the view point of capacity and output characteristics. For example, a Li—Co-based complex oxide such as $LiCoO_2$, a Li—Ni-based complex oxide such as $LiNiO_2$, a Li—Mn-based complex oxide such as a spinel $LiMn_2O_4$, and $LiFeO_2$ are preferably used as the lithium-transition metal complex oxide. The alloy-based negative-electrode material preferably contains an element which can form an alloy with lithium, such as silicon, silicon oxide, tin dioxide, silicon carbide, and tin.

The negative-electrode active material layers 145 and the positive-electrode active material layers 165 may further contain additives such as a binder and a conductive additive. For example, polyamic acid, polyethylene (PE), polypropylene (PP), polyethylene terephthalate (PET), polyether nitrile (PEN), polyimide (PI), polyamide (PA), polytetrafluoroethylene (PTFE), styrene-butadiene rubber (SBR), polyacrylonitrile (PAN), poly(methyl acrylate) (PMA), poly(methyl methacrylate) (PMMA), polyvinyl chloride (PVC), polyvinylidene difluoride (PVdF), or a mixture of these materials are preferably used as the binder. Moreover, the conductive additive is an additive blended to improve the conductivity of the negative-electrode active material layers 145 and the positive-electrode active material layers 165. For example, carbon materials such as graphite, vapor-grown carbon fiber, and carbon black which is, for example, acetylene black or the like are preferably used as the conductive additive.

For example, iron, stainless-steel, chrome, nickel, manganese, titanium, molybdenum, vanadium, niobium, aluminum, copper, silver, gold, platinum, and carbon can be used as the material of the negative-electrode current collectors 140 and the positive-electrode current collectors 160. Aluminum and copper are preferable as the material of the negative-electrode current collectors 140 and the positive-electrode current collectors 160, from the view point of electron conductivity and cell operating potential.

The separators 170, 180 are made of polyolefin such as porous polyethylene (PE) and polypropylene (PP), and are preferably made of a material with air permeability. Moreover, a laminated body having a three-layer structure of PP/PE/PP, a laminated body having a two-layer structure of heat-resistance layer/polyolefin, a laminated body having a three-layer structure of heat-resistance layer/polyolefin/heat-resistance layer, a laminated body having a three-layer structure of polyolefin/heat-resistance layer/polyolefin, polyamide, polyimide, aramid, and non-woven fabric can be used as the material of the separators 170, 180. A ceramic material such as alumina can be used as the material of the heat-resistance layer, but the material is not limited to this. For example, cotton, rayon, acetate, nylon, and polyester can be used as the non-woven fabric.

An electrolyte permeates the separators 170, 180 and the separators 170, 180 thereby exhibit permeability of lithium ions. For example, a liquid electrolyte and a polymer electrolyte can be used as the electrolyte contained in the separators 170, 180.

The liquid electrolyte which can be contained in the separators 170, 180 is in such a form that lithium salt which is a supporting salt is dissolved in an organic solvent which is a plasticizer. For example, cyclic carbonates such as propylene carbonate, ethylene carbonate (EC), and vinylene carbonate as well as linear carbonates such as dimethyl carbonate, methyl ethyl carbonate, diethyl carbonate (DEC) can be used as the organic solvent used as the plasticizer. For example, inorganic acid anion salts such as $LiPF_6$, $LiBF_4$, $LiClO_4$, $LiAsF_6$, $LiTaF_6$, $LiAlCl_4$, and $Li_2B_{10}Cl_{10}$ as well as organic acid anion salts such as $LiCF_3SO_3$, $Li(CF_3SO_2)_2N$, and $Li(C_2F_5SO_2)_2N$ can be used as the supporting salt.

Polymer electrolytes which can be contained in the separators 170, 180 can be categorized into a gel electrolyte containing electrolyte solution and an intrinsic polymer electrolyte containing no electrolyte solution. The gel electrolyte has a structure in which a liquid electrolyte is injected into a matrix polymer made of an ion conductive polymer. For example, polyethylene oxide (PEO), polypropylene oxide (PPO) and copolymers of these materials can be used as the ion conductive polymer. The intrinsic polymer electrolyte has a structure in which the supporting salt (lithium salt) is dissolved in the matrix polymer described above, and contains no organic solvent which is the plasticizer.

Figure 5:
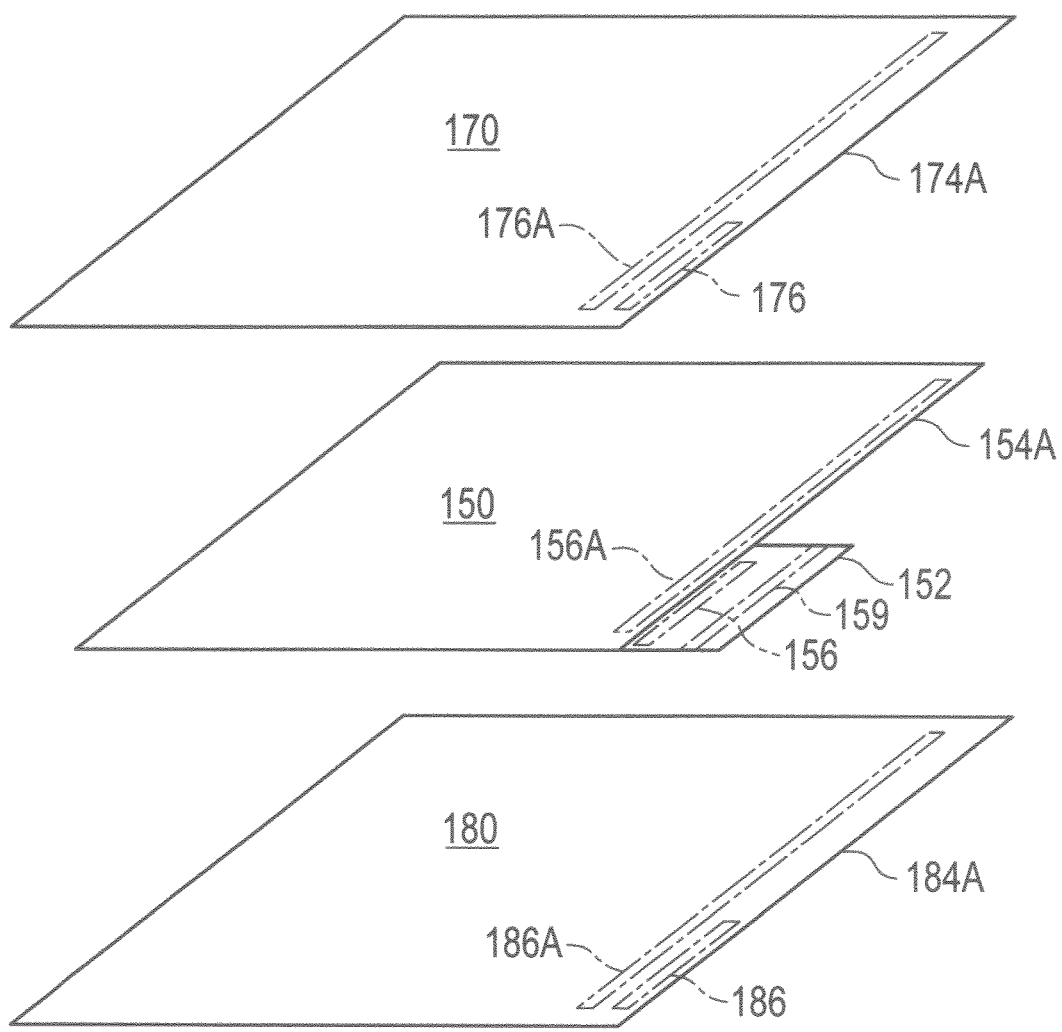
FIG. 5 is an exploded perspective view for explaining a modified example 1 of the first embodiment.
Figure 6:
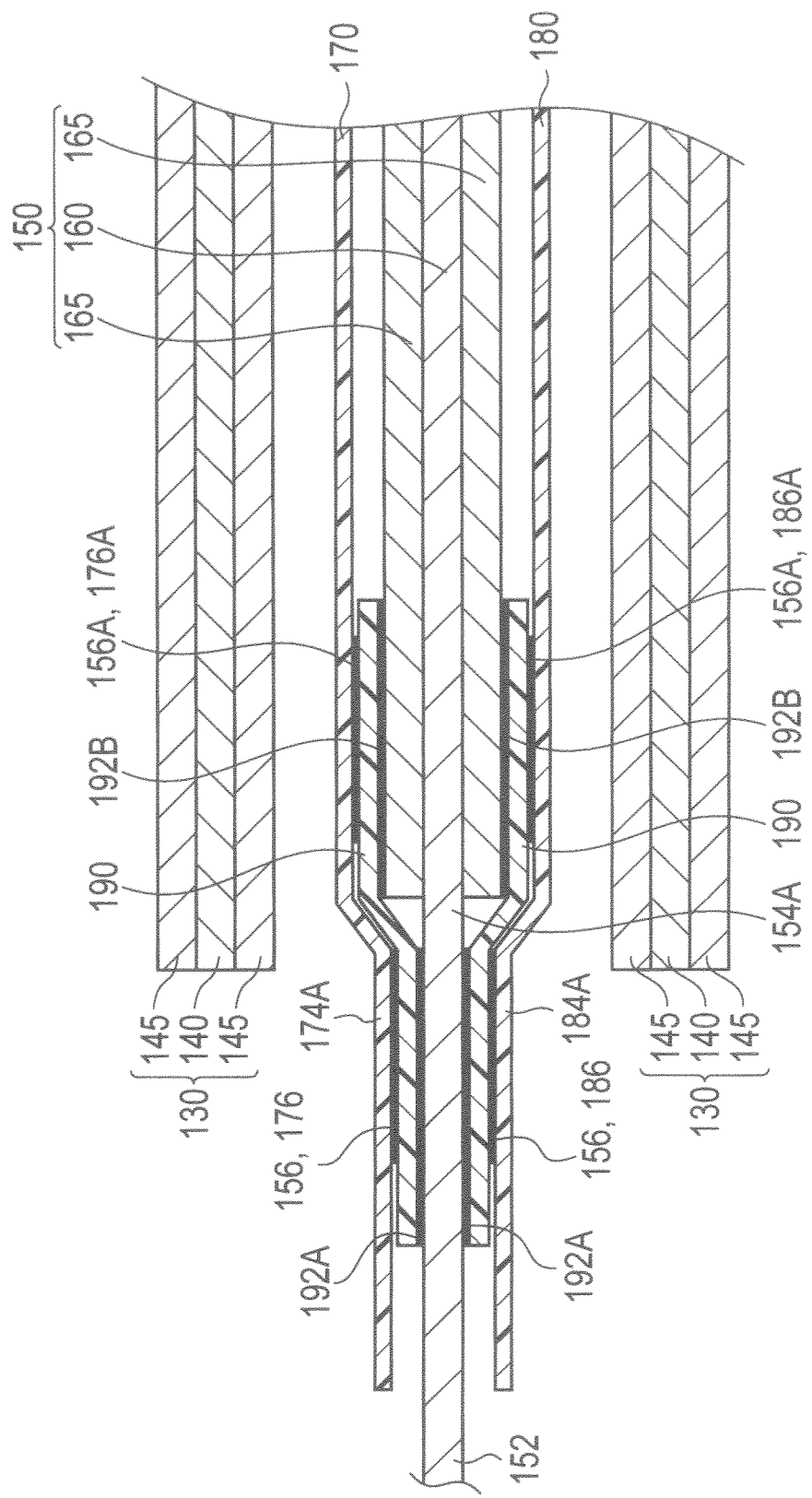
FIG. 6 is a cross-sectional view for explaining a current collecting portion in the modified example 1 of the first embodiment.
Figure 7:
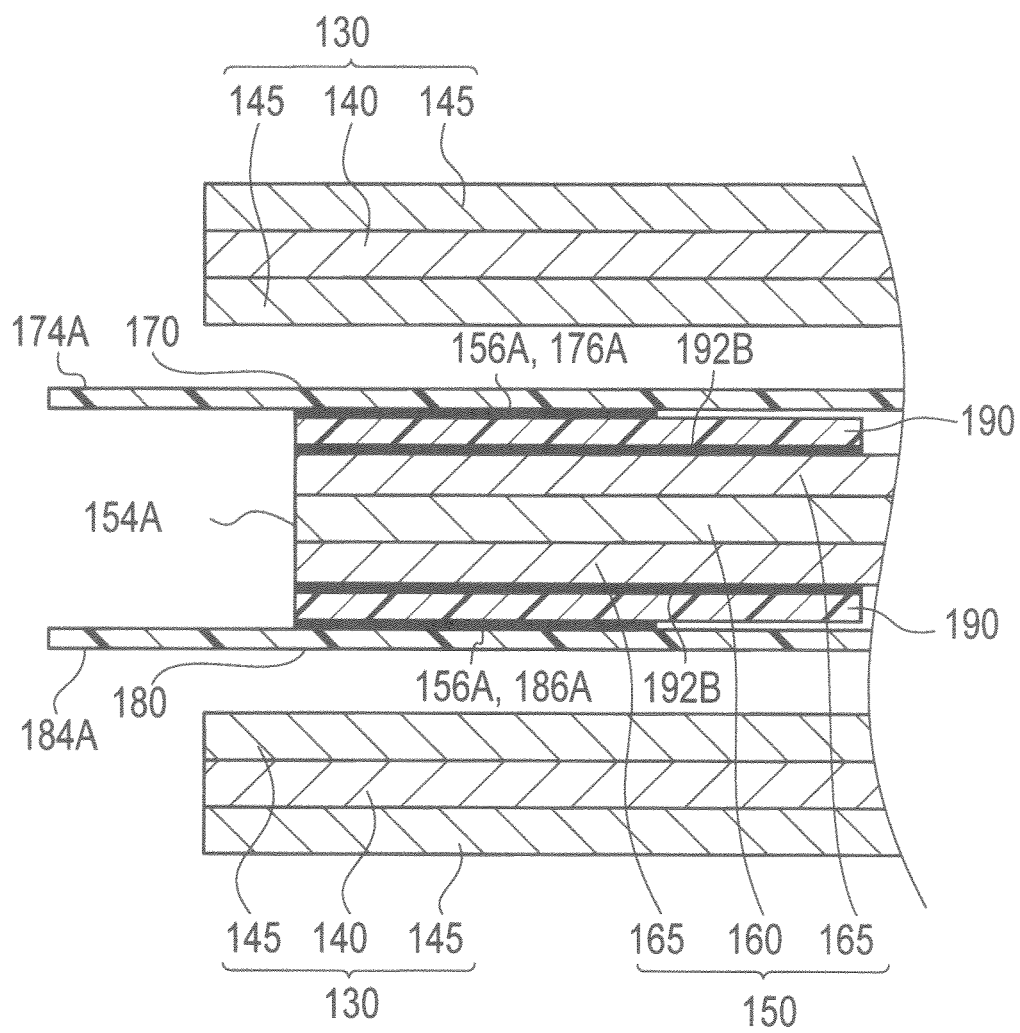
FIG. 7 is a cross-sectional view for explaining a front edge portion at a position away from the current collecting portion in the modified example 1 of the first embodiment.
Figure 8:
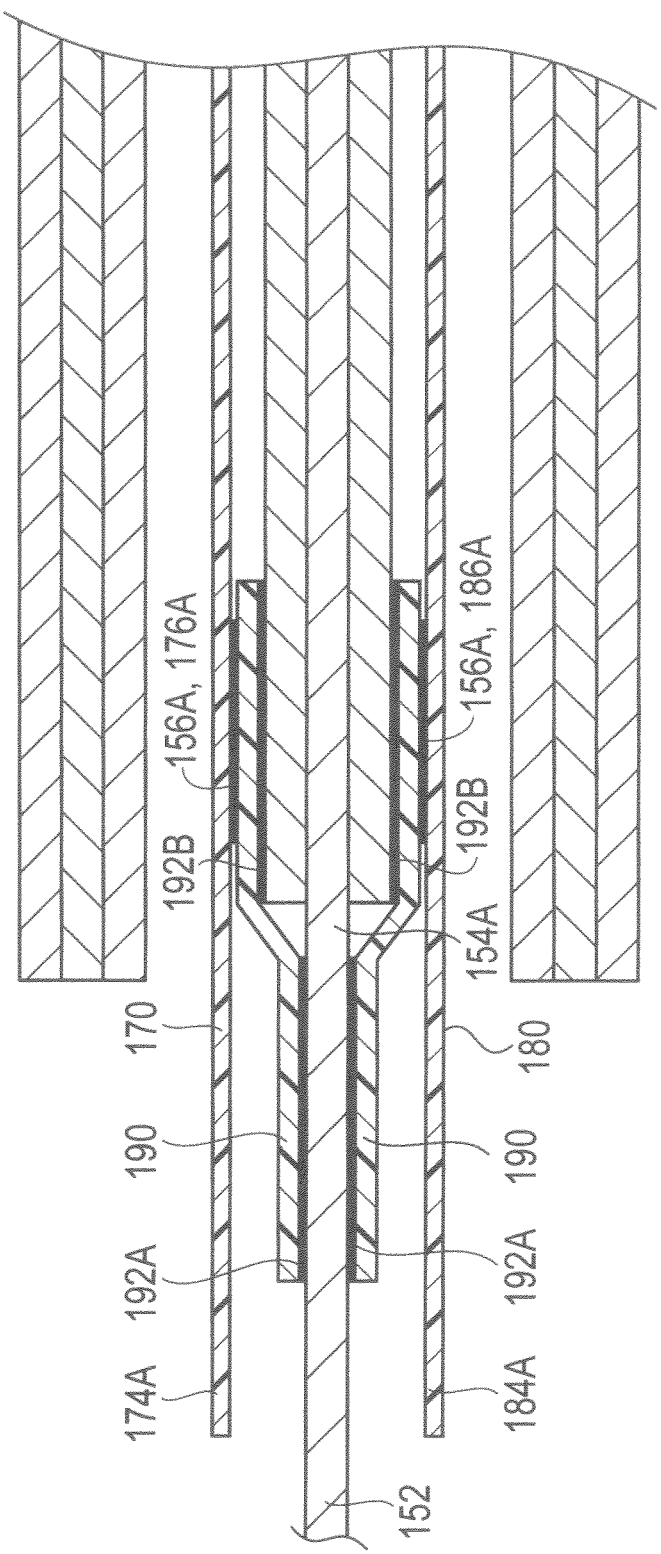
FIG. 8 is a cross-sectional view for explaining a modified example 2 of the first embodiment.

Next, modified examples 1 to 6 of the first embodiment are described one by one. FIG. 5 is an exploded perspective view for explaining the modified example 1 of the first embodiment. FIG. 6 is a cross-sectional view for explaining a current collecting portion in the modified example 1 of the first embodiment. FIG. 7 is a cross-sectional view for explaining a front edge portion at a position away from the current collecting portion in the modified example 1 of the first embodiment. FIG. 8 is a cross-sectional view for explaining the modified example 2 of the first embodiment.

In the modified example 1, the resin embers 190 are disposed on both of the positive-electrode current collecting portion 152 and the positive-electrode active material layers 165, and the positive electrode 150 and each of the separators 170, 180 are bonded to each other at two positions. Specifically, in the front edge portion 154A of the positive electrode 150, the positive-electrode current collector 160 and the one surfaces of the resin members 190 are bonded to one another in the bonding regions 192A. Moreover, the positive-electrode active material layers 165 and the one surfaces of the resin members 190 are bonded to one another in the bonding regions 192B. Furthermore, in the front edge portion 174A of the separator 170, the separator 170 and the other surface of the corresponding resin member 190 are bonded to each other in the bonding regions 156, 176. Moreover, in the front edge portion 184A of the separator 180, the separator 180 and the other surface of the corresponding resin member 190 are bonded to each other in the bonding regions 156, 186.

In addition, in the modified example 1, the positive electrode 150 to which the resin members 190 are bonded has bonding regions 156A extending along the front edge portion 154A. Moreover, the separators 170, 180 have bonding regions 176A, 186A positioned to face the bonding regions 156, 156A of the positive electrode 150. In the separator 170, the separator 170 and the other surface of the corresponding resin member 190 are bonded to each other in the bonding regions 156A, 176A. Furthermore, in the separator 180, the separator 180 and the other surface of the corresponding resin member 190 are bonded to each other in the bonding regions 156A, 186A. As described above. In the modified example 1, the positive electrode 150 and each of the resin members 190 are bonded to each other at two portions in the bonding regions 192A and 192B. Moreover, the separator 170 and the corresponding resin member 190 are bonded to each other at two positions in the bonding regions 156, 176 and 156A, 176A. Furthermore, the separator 180 and the corresponding resin member 190 are bonded to each other at two positions in the bonding regions 156, 186 and 156A, 186A. Accordingly, bonding strength between the positive electrode 150 and each of the separators 170, 180 can be improved.

As shown in the modified example 2 of FIG. 8, the bonding between the resin members 190 and the separators 170, 180 in the positive-electrode current collecting portion 152 can be omitted as necessary. In other words, the laminated cell may be configured such that no bonding regions 156, 176, 186 in FIG. 6 are provided and that the separator 170 and the corresponding resin member 190 are bonded to each other at one position in the bonding regions 156A, 176A while the separator 180 and the corresponding resin member 190 are bonded to each other at one position in the bonding regions 156A, 186A.

FIGS. 9 to 12 are exploded perspective views for explaining the modified examples 3 to 6 of the first embodiment. The resin members 190 can be disposed on the positive-electrode active material layers 165 of the positive electrode 150. In this case, the freedom in disposed positions of the resin members 190 (the bonding positions of the separators 170, 180) is improved.

Figure 9:
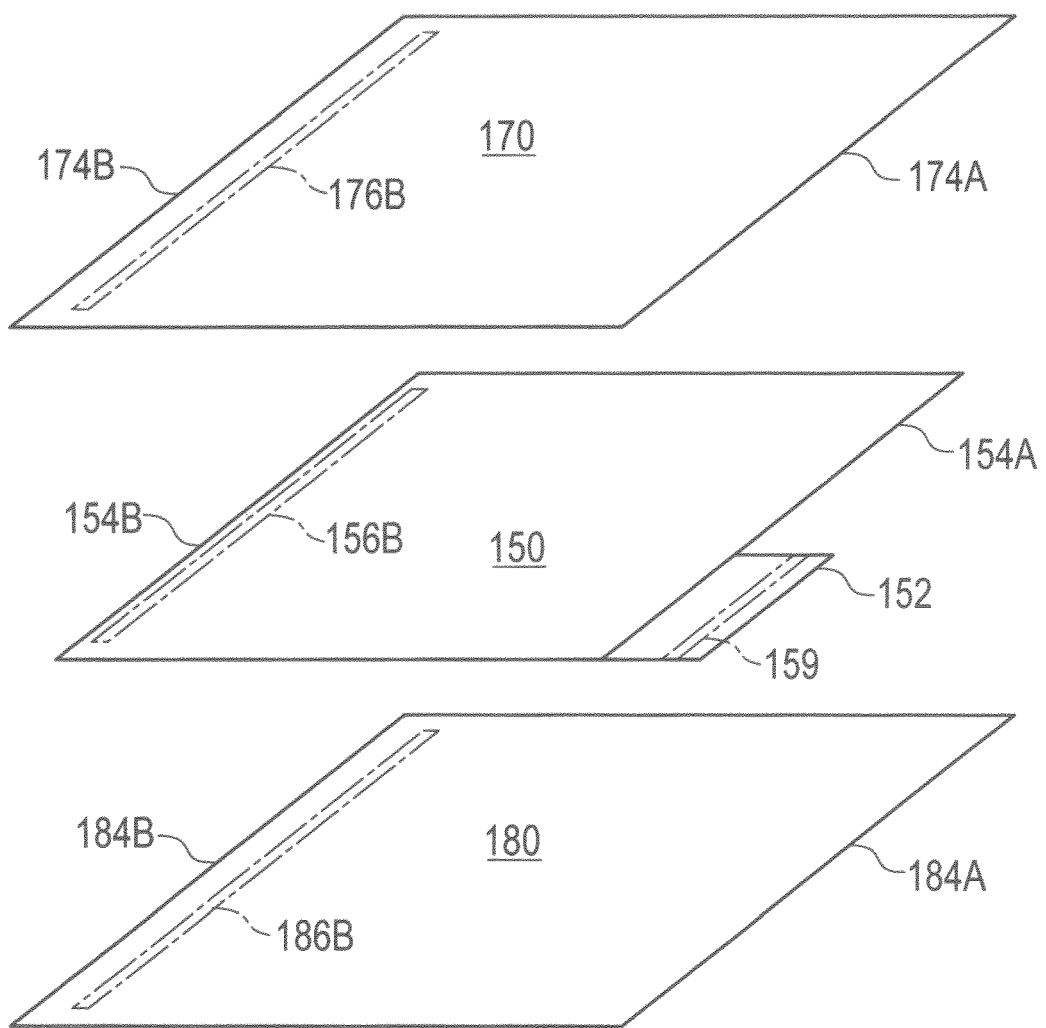
FIG. 9 is an exploded perspective view for explaining a modified example 3 of the first embodiment.

For example, as shown in FIG. 9, it is possible to dispose the resin members 190 on the positive-electrode active material layers 165 in the rear edge portion 154B of the positive electrode 150, and form bonding regions 156B, 176B, 186B which extend respectively along the rear edge portion 154B of the positive electrode 150 and the rear edge portions 174B, 184B of the separators 170, 180 (the modified example 3).

Figure 10:
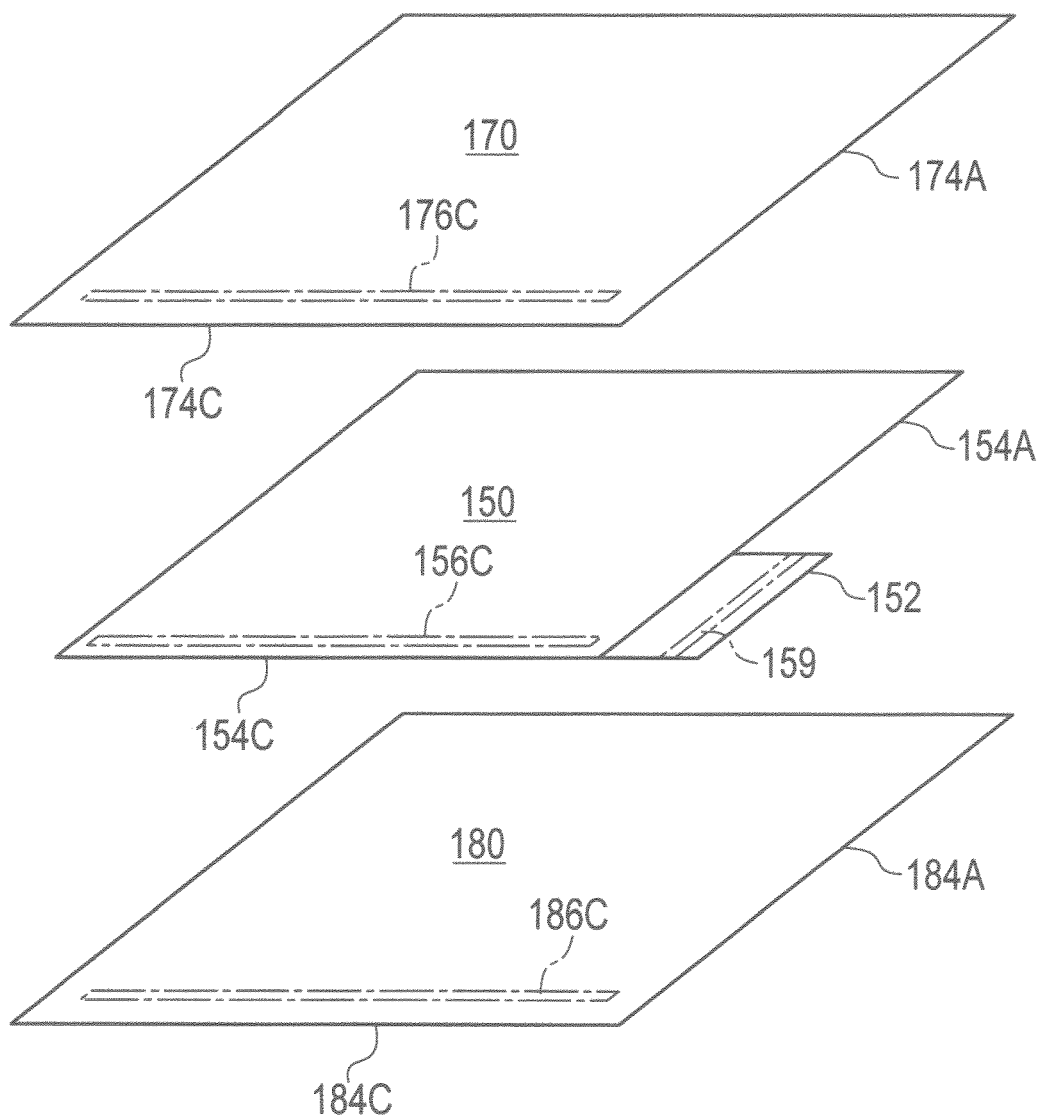
FIG. 10 is an exploded perspective view for explaining a modified example 4 of the first embodiment.

Moreover, as shown in FIG. 10, it is possible to dispose the resin members 190 on the positive-electrode active material layers 165 in the side edge portion 154C of the positive electrode 150, and form bonding regions 156C, 176C, 186C which extend respectively along the side edge portion 154C of the positive electrode 150 and the side edge portions 174C, 1840 of e separators 170, 180 (the modified example 4).

Figure 11:
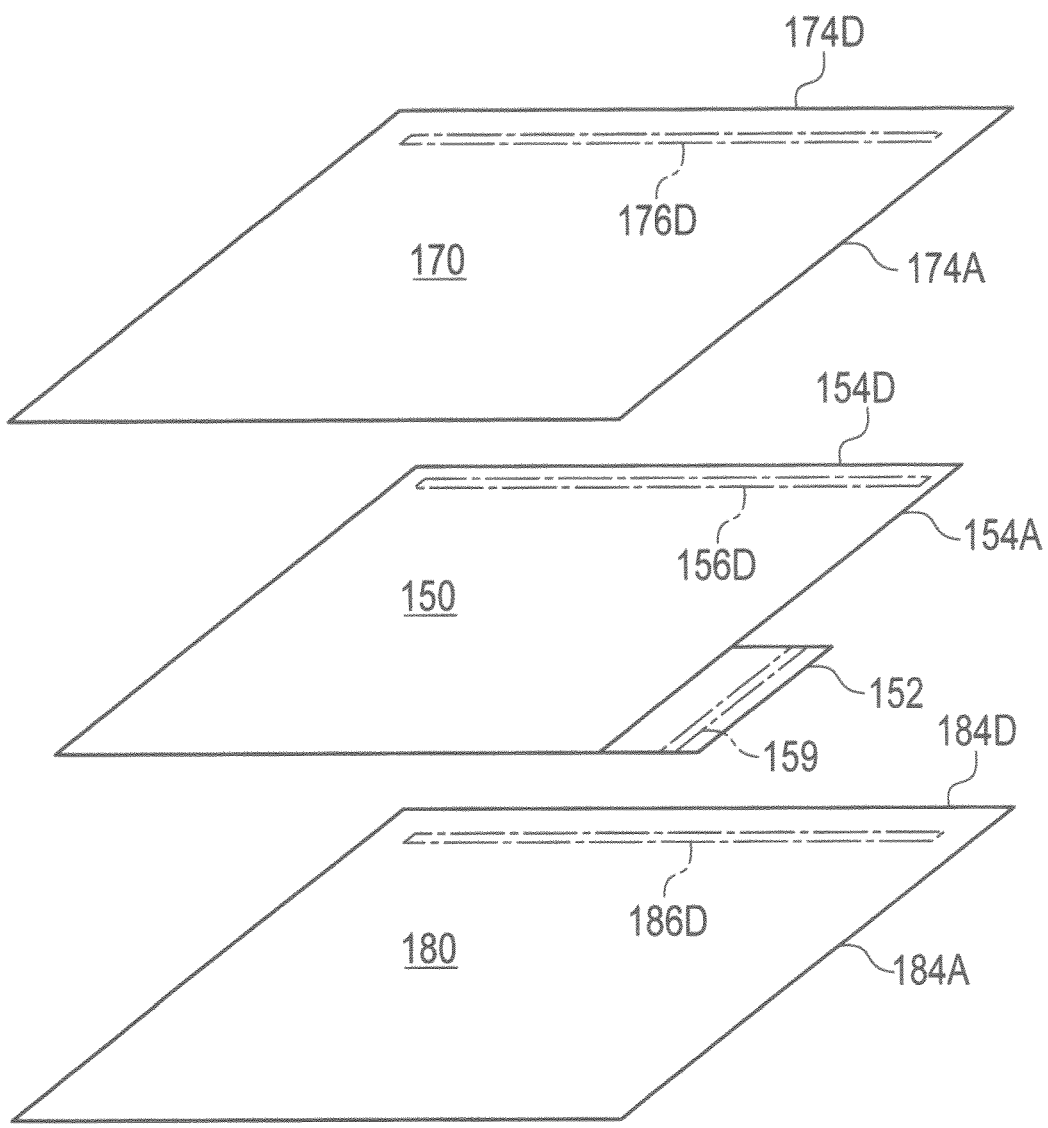
FIG. 11 is an exploded perspective view for explaining a modified example 5 of the first embodiment.

Furthermore, as shown in FIG. 11 it is possible to dispose the resin members 190 on the positive-electrode active material layers 165 in the side edge portion 154D, and form bonding regions 156D, 176D, 186D which extend respectively along the side edge portion 154D of the positive electrode 150 and the side edge portions 174D, 184D of the separators 170, 180 (the modified example 5).

Figure 12:
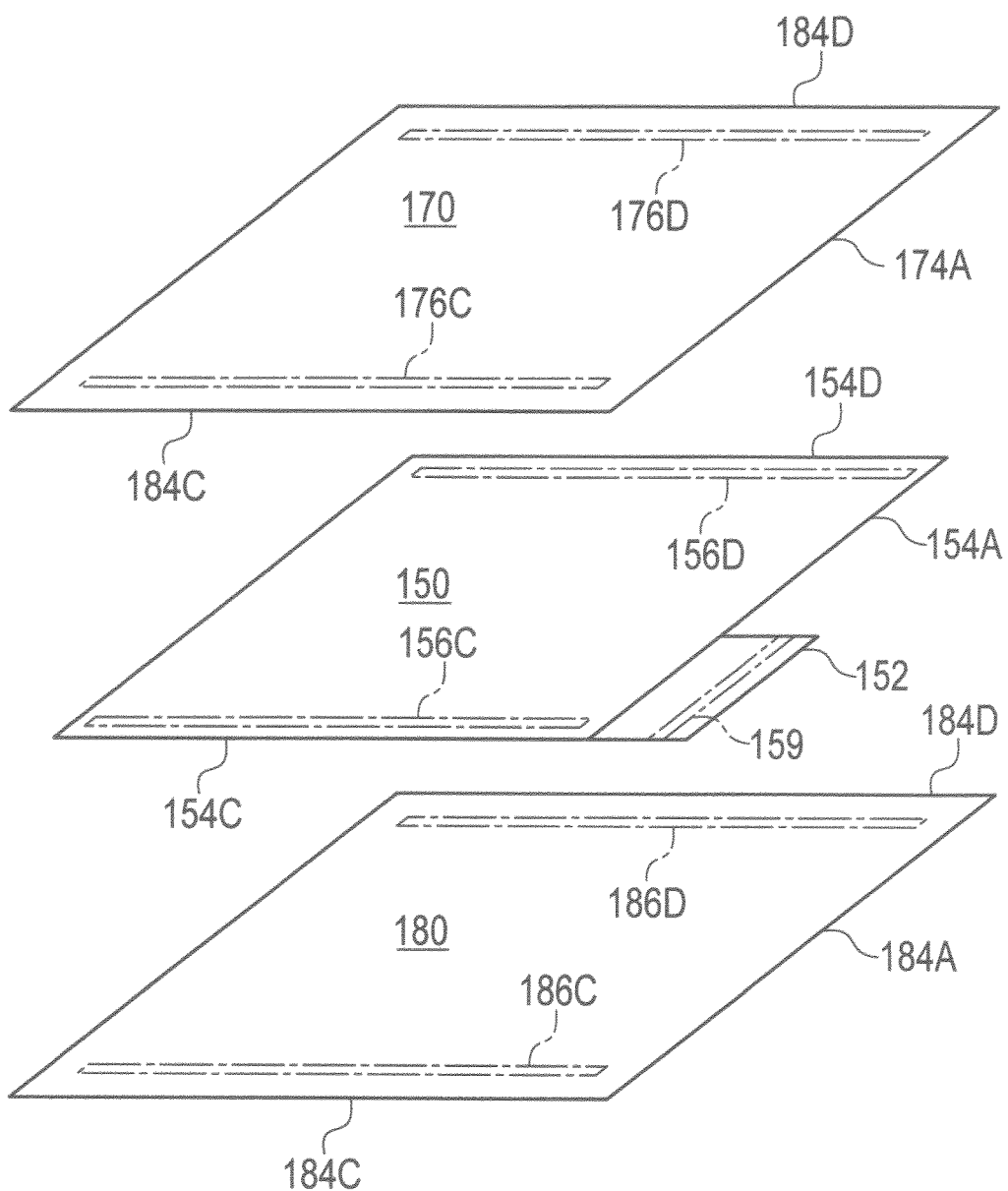
FIG. 12 is an exploded perspective view for explaining a modified example 6 of the first embodiment.

Moreover, as shown in FIG. 12, it is possible to dispose the resin members 190 on the positive-electrode active material layers 165 in both of the side edge portions 154C, 154D of the positive electrode 150, and form the bonding regions 156C, 156D, 176C, 176D, 186C, 186D (the modified example 6).

As described above, in the first embodiment, since the positive electrode and the separators are integrated together, misalignment in the stacking work can be easily suppressed and the laminated cell thus has excellent productivity. Moreover, the positive electrode and the separators are integrated by bonding the portions in both surfaces of the positive electrode and the portions of the separators on the sides facing the both surfaces of the positive electrode. Accordingly, effects on the sizes of the negative electrode, the positive electrode, and the separators are small and the laminated cell can be easily reduced in size. Thus, it is possible to provide a laminated cell which has excellent productivity and which can be easily reduced in size, and a manufacturing method for the same.

Moreover, since the resin members are electrically insulative, short circuit in the positive-electrode current collecting portion can be suppressed in the case where the resin members are disposed in the electrode collector portion.

Furthermore, in the case where the resin members are disposed on the positive-electrode active material layers, the freedom of the disposed positions of the resin members (the bonding positions of the separators) can be improved.

In addition, each of the resin members be formed of, for example, the double-sided adhesive tape including: an electrically insulative base material; and an adhesive disposed on both surfaces of the base material in the stacking direction. In this case, there is no need to, for example, dispose an adhesive or use a thermal bonding device for the bonding of the separators. Accordingly, it is possible to reduce the number of work steps and improve productivity.

Second Embodiment

Figure 13:
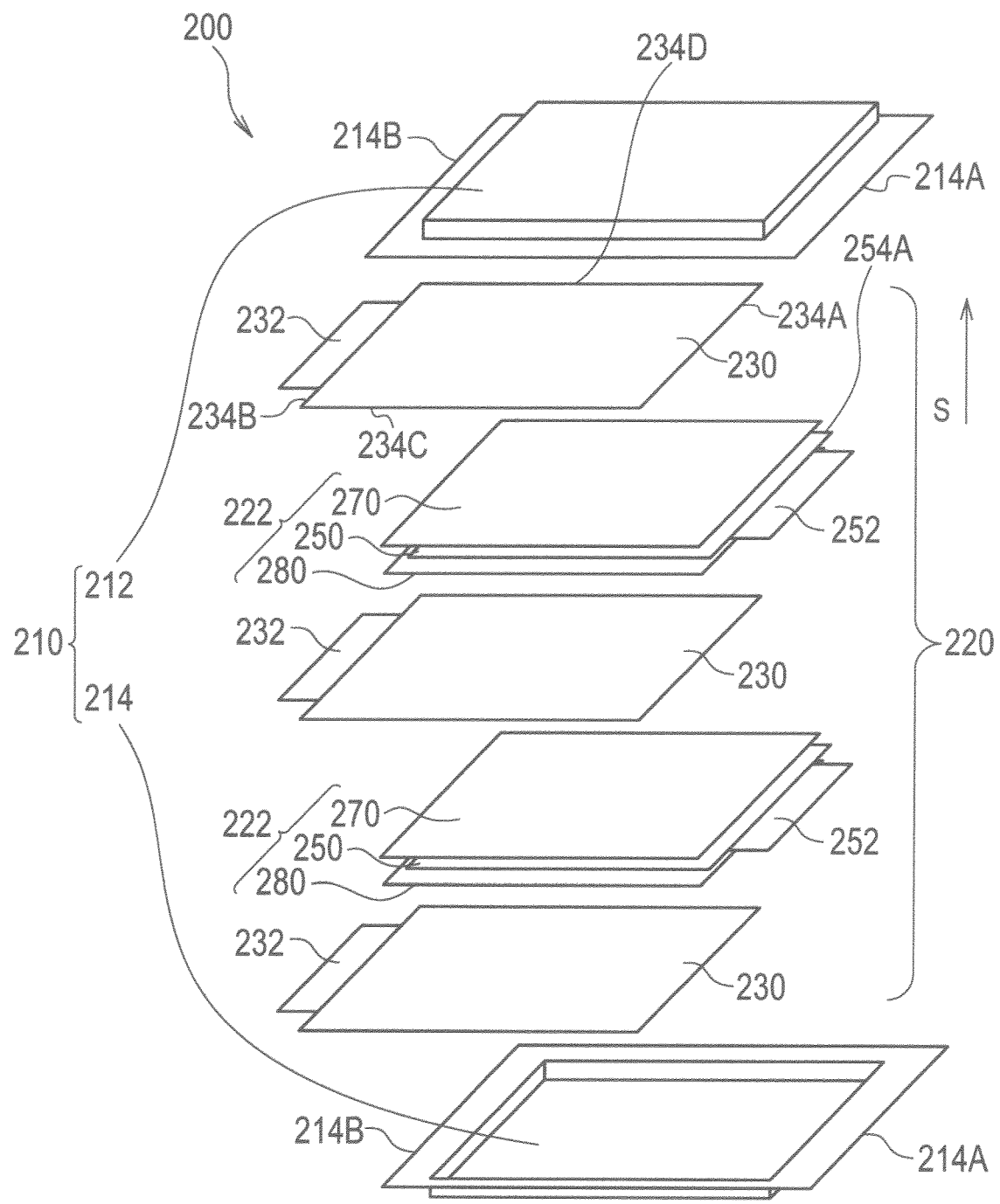
FIG. 13 is an exploded perspective view for explaining the laminated cell in a second embodiment.
Figure 14:
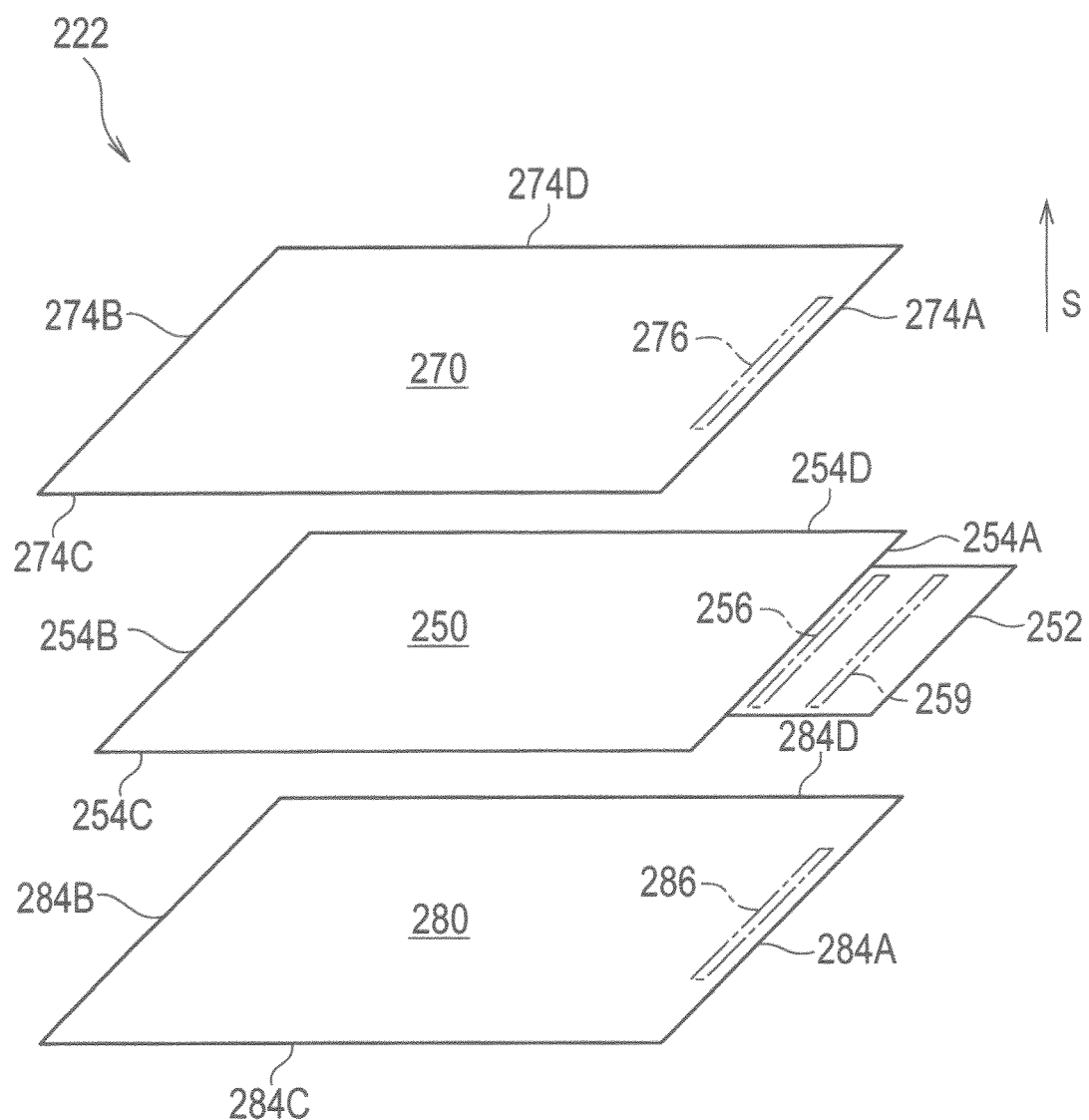
FIG. 14 is an exploded perspective view for explaining a sub-assembly shown in FIG. 13.

Next, a laminated cell in a second embodiment is described. FIG. 13 is an exploded perspective view for explaining the laminated cell in the second embodiment and FIG. 14 is exploded perspective view for explaining a sub-assembly shown in FIG. 13. In the following description, the members having the same function as those in the first embodiment are denoted by similar reference numerals and description thereof is omitted to avoid overlapping description.

The second embodiment generally differs from the first embodiment in configurations of a negative electrode, a positive electrode, and current collecting portions. Specifically, as shown in FIG. 13, a laminated cell 200 in the second embodiment has an exterior member 210 formed of an upper portion 212 and a lower portion 214; and a laminated body 220 forming a cell main body. Note that reference numerals 214A and 214B respectively denote a front edge portion and a rear edge portion of the exterior member 210.

The laminated body 220 is formed by sequentially stacking negative electrodes 230 and sub-assemblies 222. The sub-assemblies 222 each have a positive electrode 250 and separators 270, 280. The separators 270, 280 are disposed respectively on both sides of the positive electrode 250 in a stacking direction S.

A negative-electrode current collecting portion 232 of each negative electrode 230 is disposed substantially at the center of a rear edge portion 234B. A positive-electrode current collecting portion 252 of each positive electrode 250 is disposed substantially at the center of a front edge portion 254A. Since the rear edge portion 234B and the front edge portion 254A are opposite and spaced away from each other, the positive-electrode current collecting portion 252 and the negative electrode current collecting portion 232 do not overlap each other in a stacking direction S. Note that reference numeral 234A denotes a front edge portion of each negative electrode 230 while reference numerals 234C, 234D denote side edge portions of each negative electrode 230.

Moreover, as shown in FIG. 14, in each sub-assembly 222, film-like resin members (see reference numeral 190 in FIG. 3) are bonded to both surfaces of the positive electrode 250 in the stacking direction S. Furthermore, front edge portions 274A, 284A of the separators 270, 280 are bonded to the resin members.

In other words, both surfaces of the positive electrode 250 in the stacking direction S have the front edge portion 254A to which the resin members are bonded, and the separators 270, 280 have the front edge portions 274A, 284A to which the resin members are bonded. Since the positive electrode 250 and the separators 270, 280 are integrated together, misalignment in a stacking work can be easily suppressed and the laminated cell has excellent productively. Moreover, the positive electrode 250 and the separators 270, 280 are integrated by bonding the outer peripheral portions 254A, 274A, 284A (bonding regions 256, 276, 286) via the resin members. Accordingly, effects on the sizes of the negative electrode 230, the positive electrode 250, and the separators 270, 280 are small and the laminated 200 can be easily reduced in size. Thus, it is possible to provide a laminated cell which has excellent productivity and which can be easily reduced in size, and a manufacturing method for the same. Not that reference numeral 259 denotes a bonding region of the positive-electrode current collecting portion 252 to the front edge portion 214A of the exterior member 210.

Next modified examples 1 to 4 of the second embodiment are sequentially described.

Figure 15:
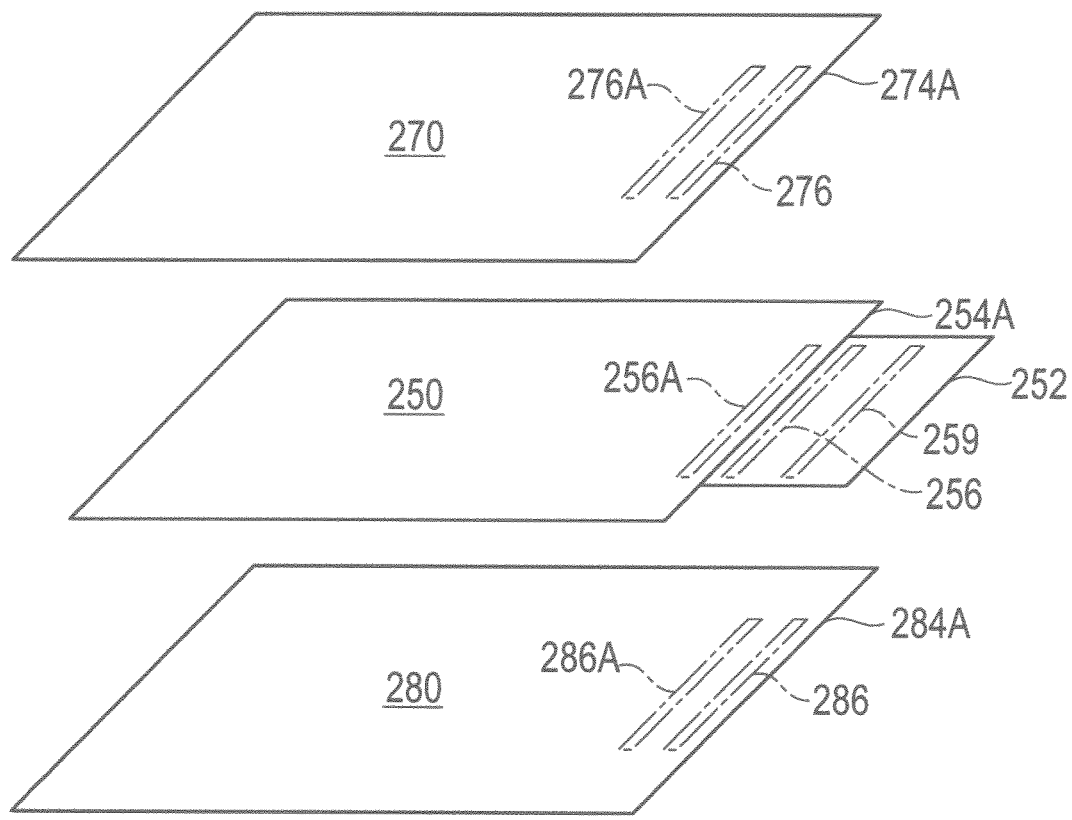
FIG. 15 is an exploded perspective view for explaining a modified example 1 of the second embodiment.

FIG. 15 is an exploded perspective view for explaining the modified example 1 of the second embodiment. As in the modified example 1 (see FIG. 5) of the first embodiment, it is possible to dispose the resin members on both of the positive-electrode current collecting portion 252 and the positive-electrode active material layers, and bond the positive electrode 250 and each of the separators 270, 280 to each other at two positions. Specifically, bonding regions 256 located in the positive-electrode current collecting portion 252 and bonding regions 256A extending along the front edge portion 254A are disposed in the positive electrode 250.

Moreover, bonding regions 276, 276A, 286, 286A positioned to face the bonding regions 256, 256A of the positive electrode 250 are disposed in the separators 270, 280. Then, the bonding regions 256, 256A of the positive electrode 250 and the bonding regions 276, 276A of the separator 270 are bonded to one another via a corresponding one of the resin members. Furthermore, the bonding regions 256, 256A of the positive electrode 250 and the bonding regions 286, 286A of the separator 280 are bonded to one another via a corresponding one of the resin members. Accordingly, bonding strength between the positive electrode 250 and each of the separators 270, 280 can be improved.

Figure 16:
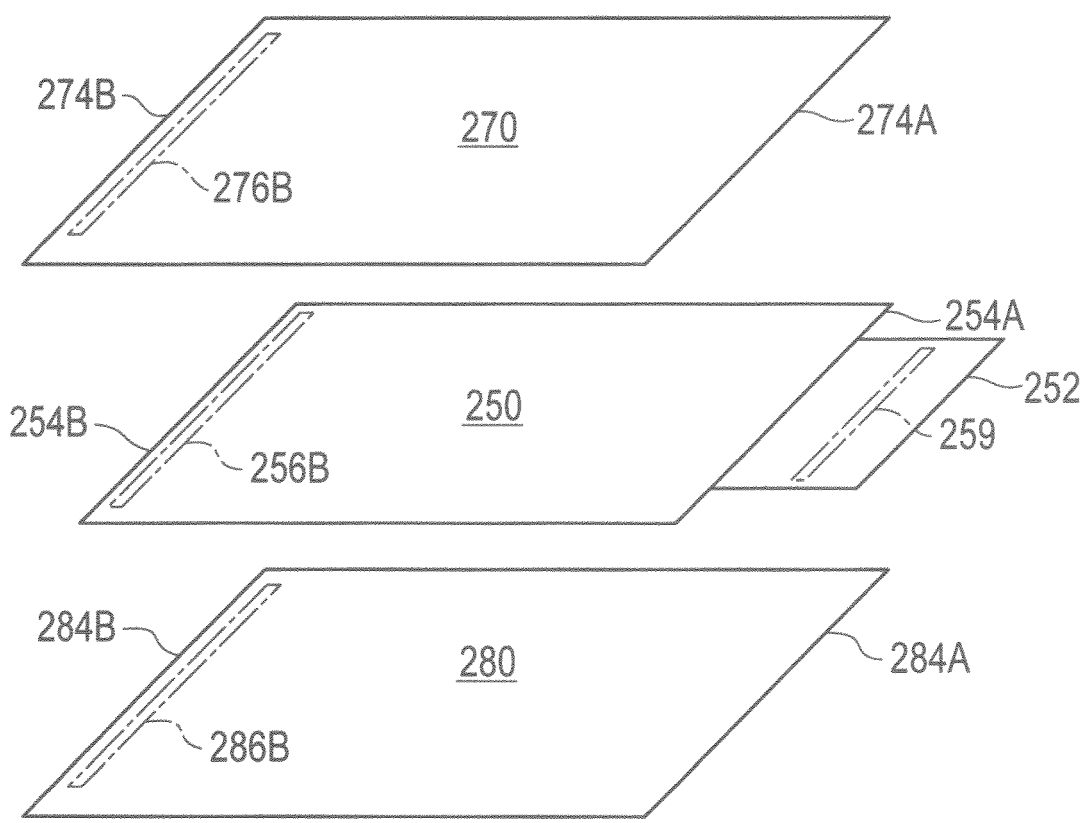
FIG. 16 is an exploded perspective vie or explaining a modified example 2 of the second embodiment.
Figure 17:
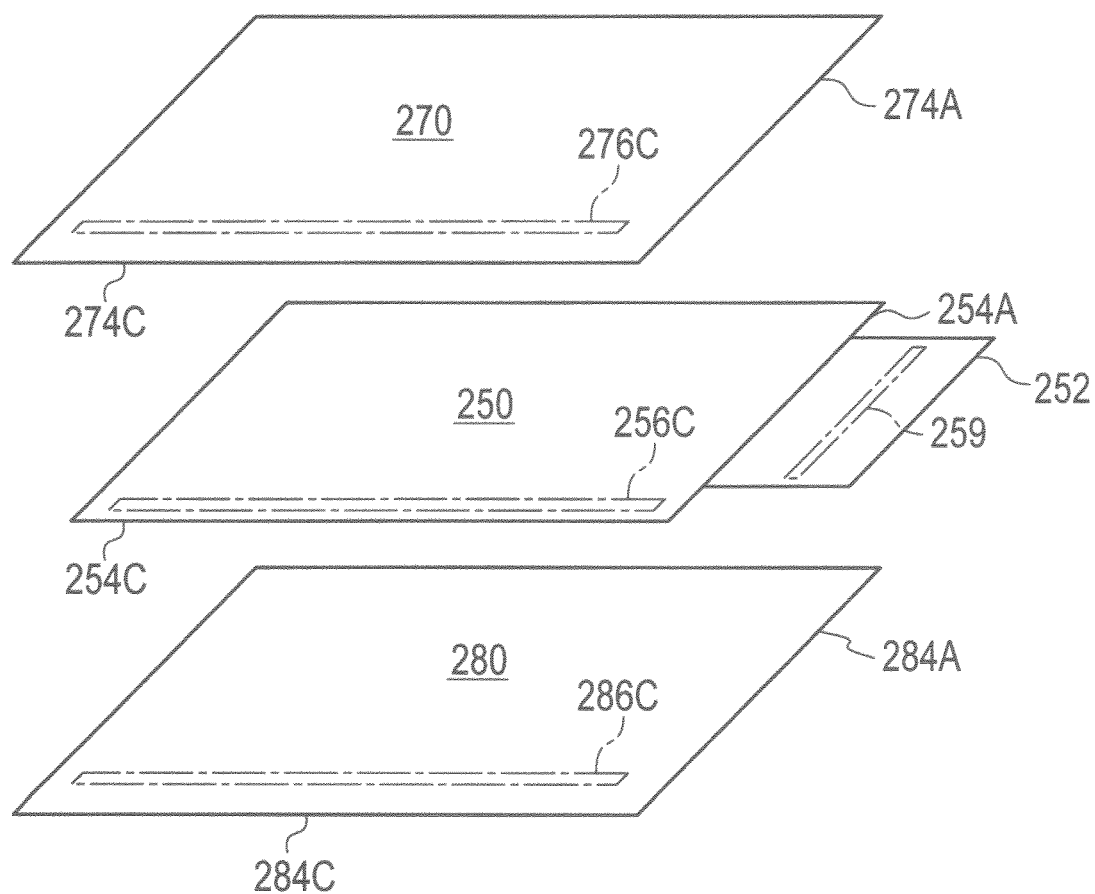
FIG. 17 is an exploded perspective view for explaining a modified example 3 of the second embodiment.
Figure 18:
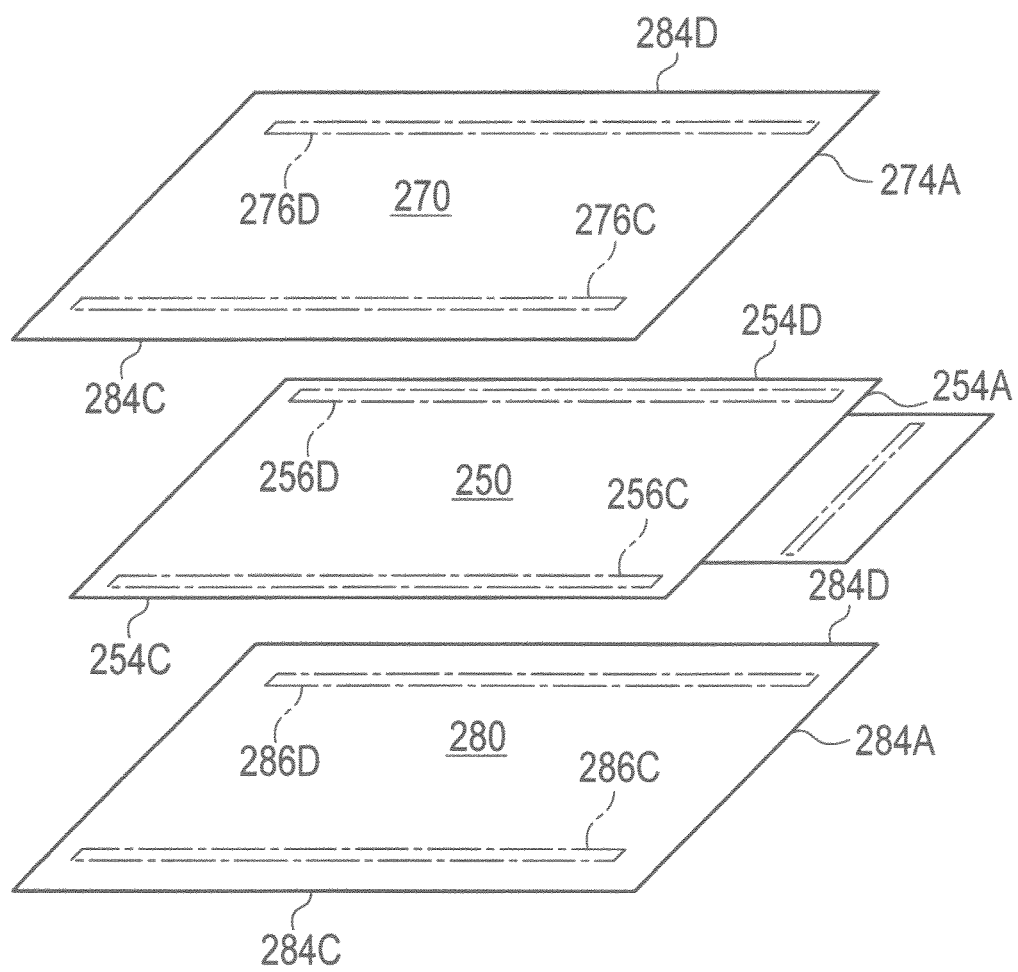
FIG. 18 is an exploded perspective view for explaining a modified example 4 of the second embodiment.

FIGS. 16 to 18 are exploded perspective views for explaining the modified examples 2 to 4 of the second embodiment. In order to improve the freedom in disposed positions of the resin members 290 (the bonding positions of the separators 270, 280), the resin members can be disposed on the positive-electrode active material layers of the positive electrode 250.

For example, the arrangement can be similar to that in the modified example 3 (see FIG. 9) of the first embodiment. Specifically, as shown in FIG. 16, it is possible to dispose the resin members on the positive-electrode active material layers in a rear edge portion 254B of the positive electrode 250, and form bonding regions 256B, 276B, 286B which extend respectively along the rear edge portion 254B and rear edge portions 274B, 284B of the separators 270, 280.

Moreover, the arrangement can be similar to that in the modified example 4 (see FIG. 10) of the first embodiment. Specifically, as shown in FIG. 17, it is possible to dispose the resin members on the positive-electrode active material layers in a side edge portion 254C of the positive electrode 250, and form bonding regions 256C, 276C, 286C which extend respectively along the side edge portion 254C and side edge portions 274C, 284C of the separators 270, 280. Note that the resin members can be disposed in a side edge portion 254D as in the modified example 5 (see FIG. 11) of the first embodiment.

Moreover, the arrangement can be similar to that in the modified example 6 (see FIG. 12) of the first embodiment.

Specifically, as shown in FIG. 18, it is possible to dispose the resin members on the positive-electrode active material layers in both of the side edge portions 254C, 254D of the positive electrode 250, and form the bonding regions 256C, 256D, 276C, 276D, 286C, 286D.

As described above, in a case where a laminated cell has a configuration in which a negative-electrode current collecting portion and a positive-electrode current collecting portion are opposite and spaced away from each other, the second embodiment can provide a laminated cell which has excellent productivity and which can be easily reduced in size, and a manufacturing method for the same.

Third Embodiment

Figure 19:
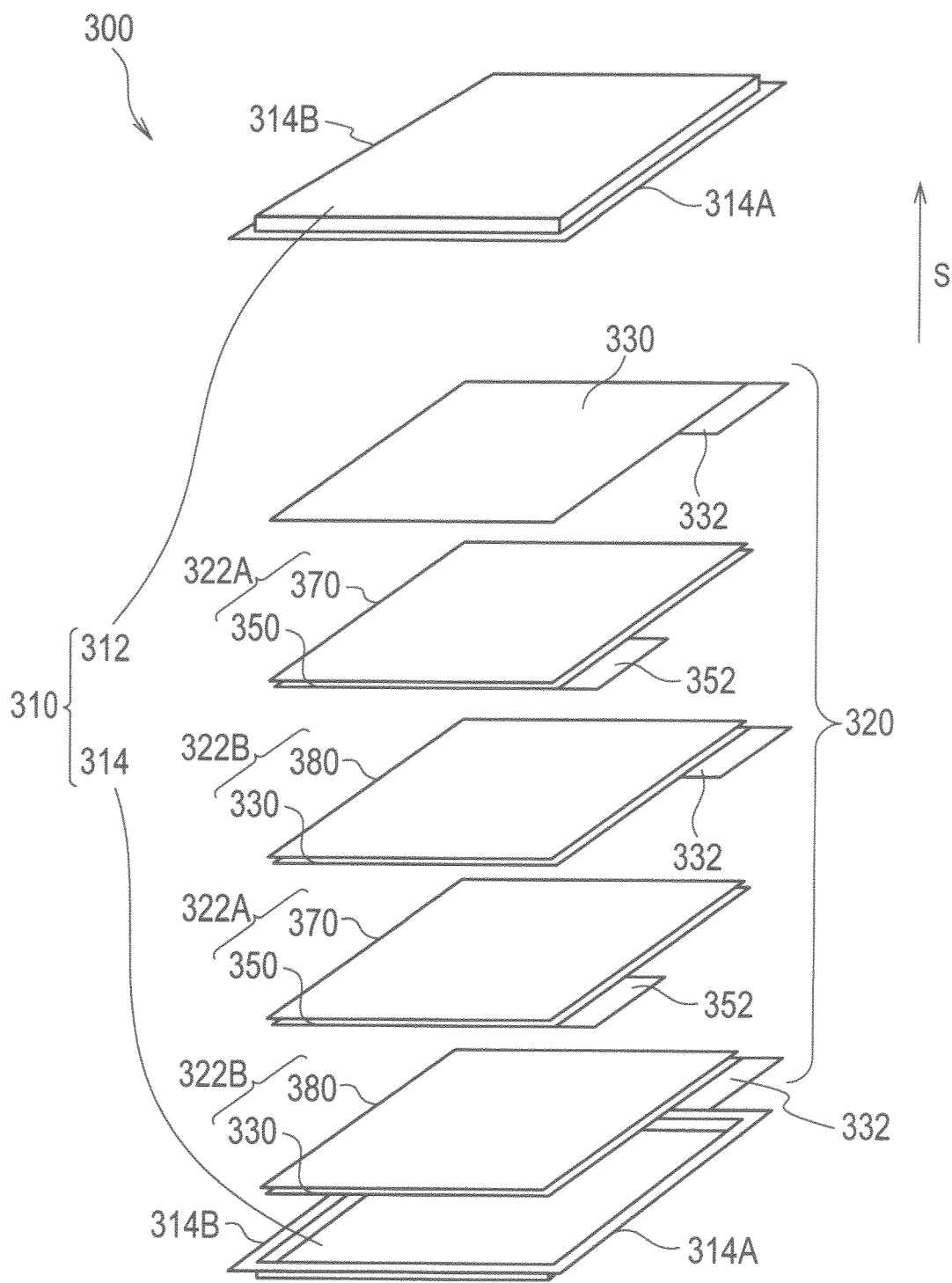
FIG. 19 is an exploded perspective view for explaining the laminated cell in a third embodiment.
Figure 20:
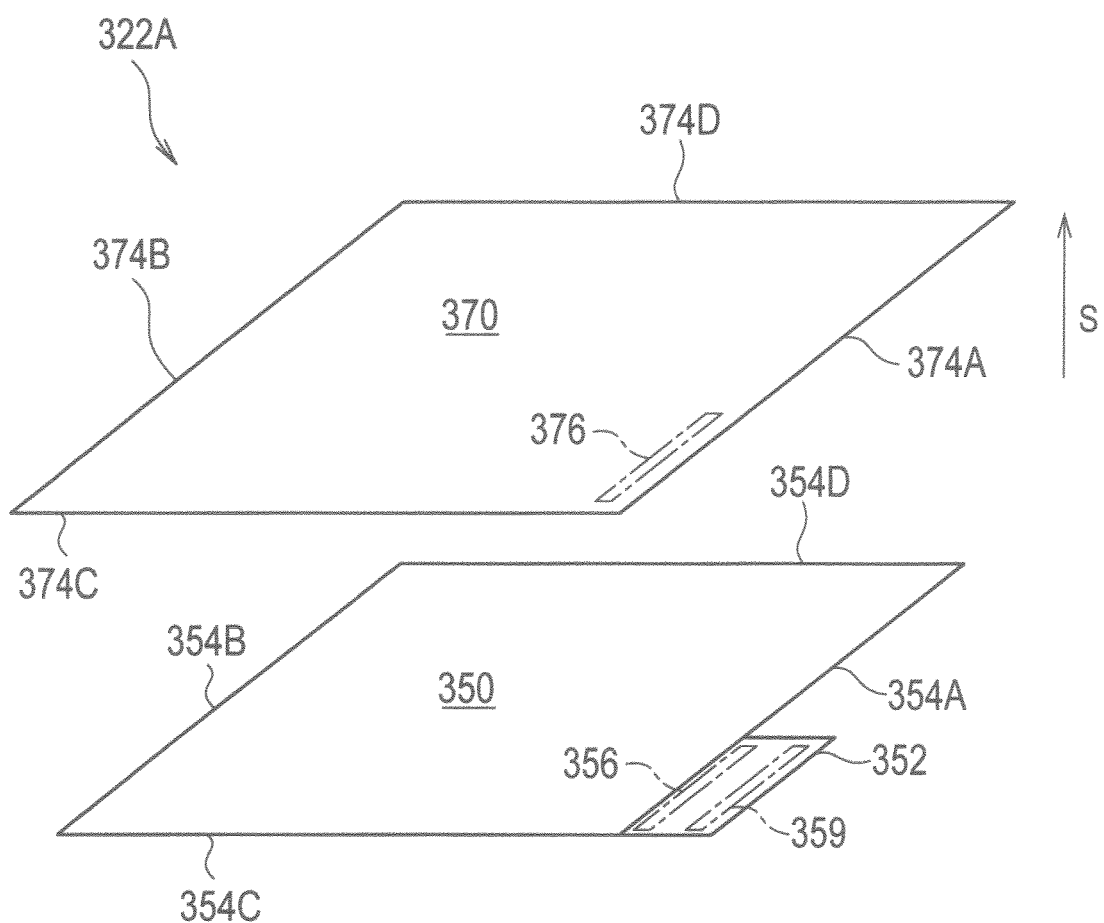
FIG. 20 is an exploded perspective view for explaining a first sub-assembly shown in FIG. 19.
Figure 21:
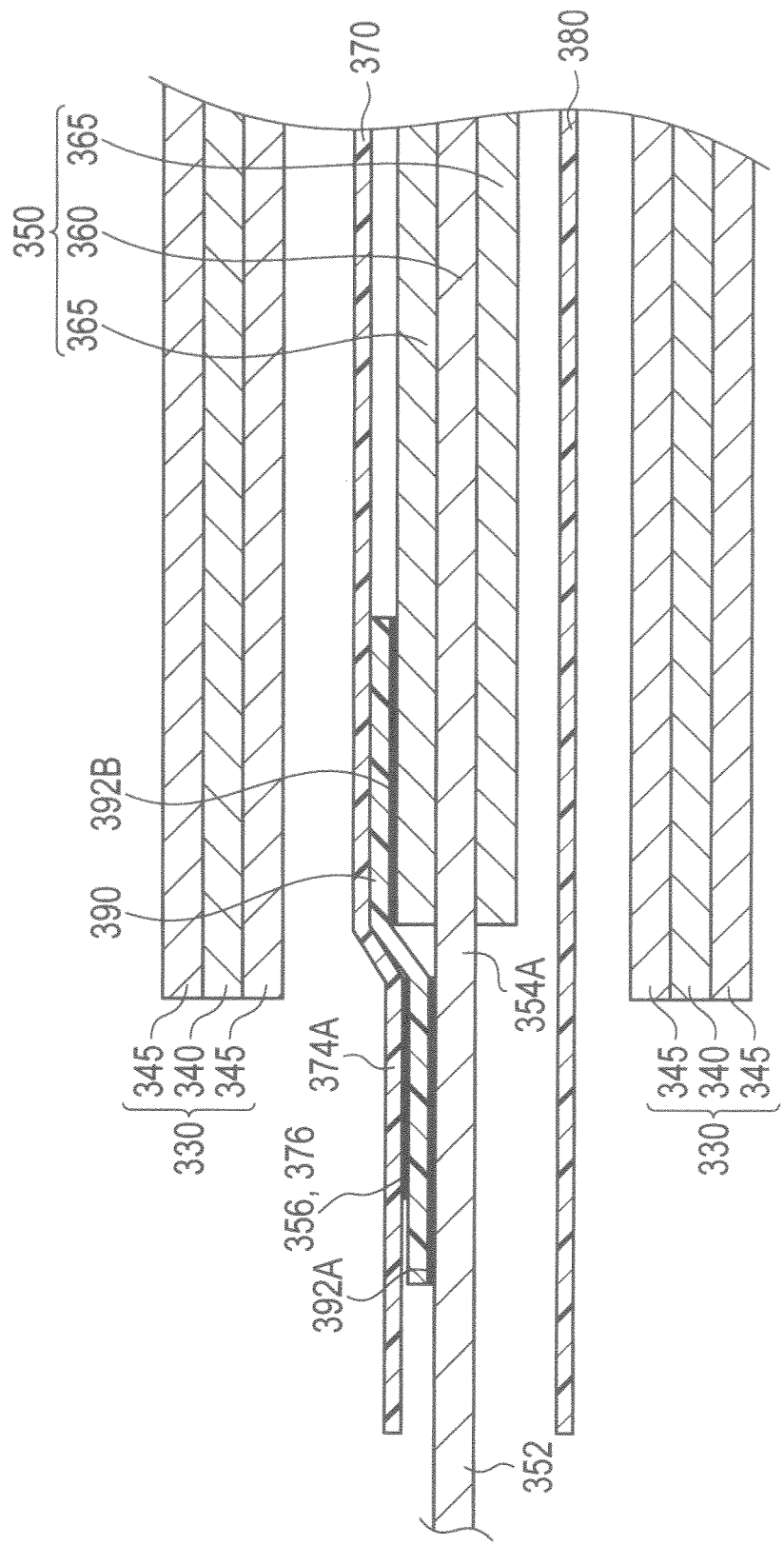
FIG. 21 is a cross-sectional vie for explaining a front portion of the first sub-assembly shown in FIG. 20.
Figure 22:
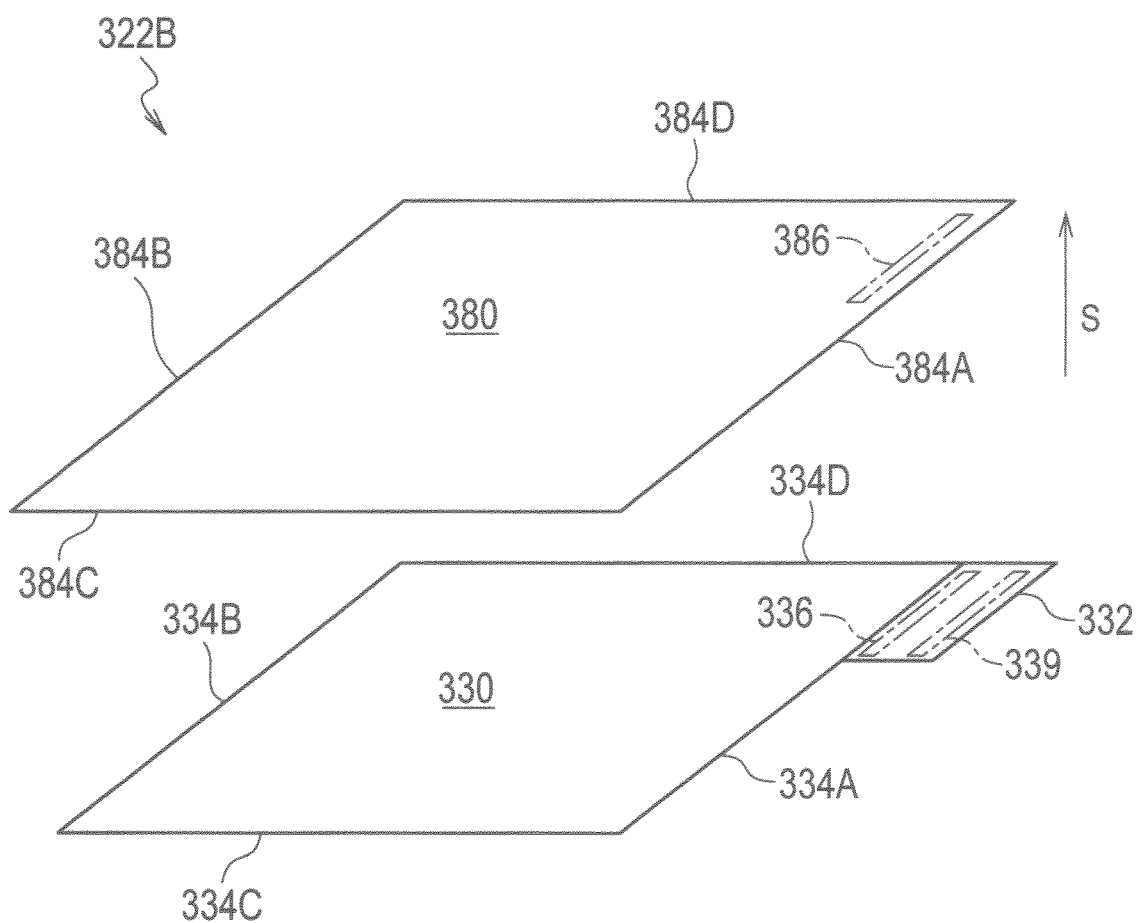
FIG. 22 is an exploded perspective view for explaining a second sub-assembly shown in FIG. 19.
Figure 23:
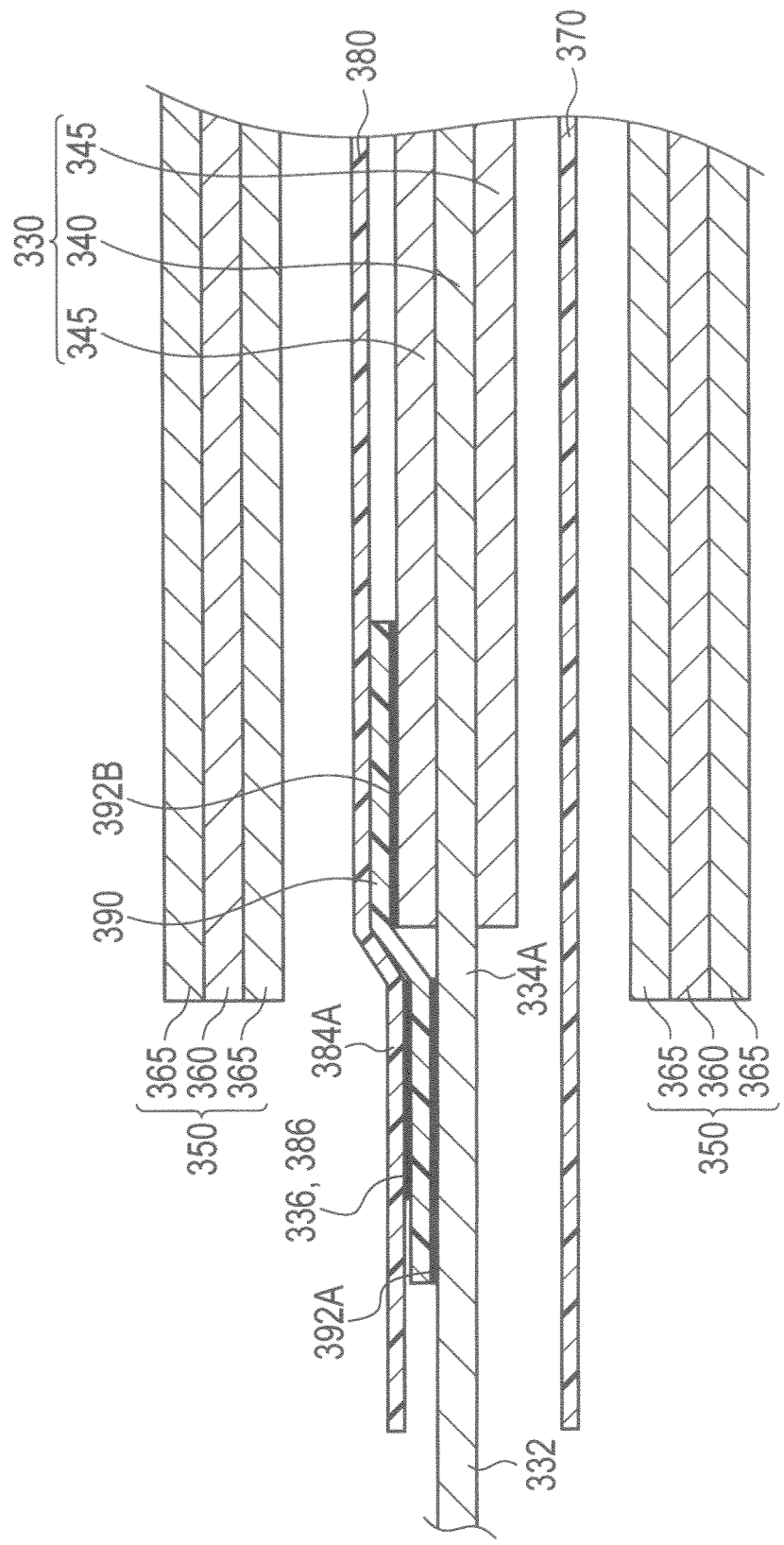
FIG. 23 is a cross-sectional view for explaining a front portion of the second sub-assembly shown in FIG. 22.

Next, a laminated cell in a third embodiment is described. FIG. 19 is an exploded perspective view for explaining the laminated in the third embodiment. FIG. 20 is an exploded perspective view for explaining a first sub-assembly shown in FIG. 19. FIG. 21 is a cross-sectional view for explaining a front portion of the first sub-assembly shown in FIG. 20. FIG. 22 is an exploded perspective view for explaining a second sub-assembly shown in FIG. 19. FIG. 23 is a cross-sectional view for explaining a front portion of the second sub-assembly shown in FIG. 22.

The third embodiment generally differs from the first embodiment in the configuration of the sub-assemblies. Specifically, a laminated cell 300 in the third embodiment has: an exterior member 310 formed of an upper portion 312 and a lower portion 314; and a laminated body 320 forming a cell main body. Note that reference numerals 314A and 314B respectively denote a front edge portion and a rear edge portion of the exterior member 310.

As shown in FIG. 19, the laminated body 320 is formed by sequentially stacking first sub-assemblies 322A and subsecond assemblies 322B below a negative electrode 330. As shown in FIG. 20, each first sub-assembly 322A has a positive electrode 350 and a separator 370. As shown in FIG. 22, each second sub-assembly 322B has the negative electrode 330 and a separator 380. The separator 370 and the separator 380 are disposed respectively on one surface of the positive electrode 350 and one surface of the negative electrode 330 in a stacking direction S.

As shown in FIGS. 21 and 22, each negative electrode 330 has negative-electrode current collector 340, negative-electrode active material layers 345, and a negative-electrode current collecting portion 332. Moreover, an outer peripheral portion of the negative electrode 330 is formed of a front edge portion 334A in which the negative-electrode current collecting portion 332 is disposed; a rear edge portion 334B which is opposite to the front edge portion 334A; side edge portions 334C, 334D which are opposite to each other and which connect the front edge portion 334A and the rear edge portion 334B to each other. As shown in FIGS. 20 and 21, each positive electrode 350 has a positive-electrode current collector 360, positive-electrode active material layers 365, and a positive-electrode current collecting portion 352. Moreover, outer peripheral portion of the positive electrode 350 is formed of: a front edge portion 354A in which the positive-electrode current collecting portion 352 is disposed; a rear edge portion 354B which is opposite to the front edge portion; side edge portions 354C, 354D which are opposite to each other and which connect the front edge portion 354A and the rear edge portion 354B to each other.

As shown in FIGS. 20 and 22, outer peripheral portions of the separators 370, 380 include: front edge portions 374A, 384A facing the positive-electrode current collecting portion 352 and the negative-electrode current collecting portion 332; and rear edge portions 374B, 384B opposite to the front edge portions 374A, 384A. The outer peripheral portions of the separators 370, 380 also include side edge portions 374C, 374D, 384C, 384D which are opposite to one another and which connect the front edge portions 374A, 384A and the rear edge portions 374B, 384B to one another.

As shown in FIG. 21, each first sub-assembly 322A is formed by bonding the front edge portion 374A of the separator 370 to a resin member 390 bonded to one surface of the positive electrode 350 in the stacking direction S.

In other words, the positive electrode 350 has the front edge portion 354A whose one surface in the stacking direction S is bonded with the resin member 390. In the front edge portion 354A, the positive-electrode current collector 360 and one surface of the resin member 390 are bonded to each other in a bonding region 392A. Furthermore, the one surface of the resin member 390 and a corresponding one of the positive-electrode active material layers 365 are bonded to each other in a bonding region 392B. Moreover, the separator 370 has the front edge portion 374A bonded to the resin member 390. In the front edge portion 374A of the separator 370, the separator 370 and the other surface of the resin member 390 are bonded to each other in bonding regions 356, 376.

As described above, since the positive electrode 350 and the separator 370 integrated together via the resin member 390, misalignment in the stacking work can be easily suppressed. Moreover, the integration is performed by bonding the front edge portion 354A (the bonding region 356) which is located on the one surface of the positive electrode 350 and the front edge portion 374A (the bonding region 376) in the separator 370 which is on the side facing the one surface of the positive electrode 350. Accordingly, effects on the sizes of the positive electrode 350 and the separator 370 are small.

Moreover, as shown in FIG. 23, each second sub-assembly 322B is formed by bonding the front edge portion 384A of the separator 380 to the resin member 390 bonded to one surface of the negative electrode 330 in the stacking affection S.

In other words, the negative electrode 330 has the front edge portion 334A whose one surface in the stacking direction S is bonded with the resin member 390. In the front edge portion 334A, the negative-electrode current collector 340 and one surface of the resin member 390 are bonded to each other in the bonding region 392A. Furthermore, the one surface of the resin member 390 and a corresponding one of the negative-electrode active material layers 345 are bonded to each other in the bonding region 392B. Moreover, the separator 380 has the front edge portion 384A bonded to the resin member 390. In the front edge portion 384A of the separator 380, the separator 380 and the other surface of the resin member 390 are bonded to each other in bonding regions 336, 386.

As described above, since the negative electrode 330 and the separator 380 are integrated together via the resin member 390, misalignment in the stacking work can be easily suppressed. Moreover, the integration is performed by bonding the front edge portion 334A (the bonding region 336) which is located on the one surface of the negative electrode 330 and the front edge portion 384A (the bonding region 386) in the separator 380 which is on the side facing the one surface of the negative electrode 330. Accordingly, effects on the sizes of the negative electrode 330 and the separator 380 are small.

Note that reference numeral 339 denotes a bonding region of the negative-electrode current collecting portion 332 to the front edge portion 314A of the exterior member 310. Moreover, reference numeral 359 denotes a bonding region of the positive-electrode current collecting portion 352 to the front edge portion 314A of the exterior member 310.

As described above, in the third embodiment, since the positive electrode and the separator as well as the negative electrode and the separator are integrated, misalignment in the stacking work can be easily suppressed and the laminated cell thus has excellent productivity. Moreover, the integration is performed by bonding, via the resin member, the portion which is located on one surface of the positive electrode or the negative electrode and the portion in the separator which is located on the side facing the one surface. Accordingly, effects on the sizes of the negative electrode, the positive electrode, and the separators are small and the laminated cell can be easily reduced in size. Thus, in a case where a bonding member (separator) is bonded only to one surface of a positive electrode or a negative electrode in the stacking direction, it is possible to provide a laminated cell which has excellent productivity and which can be easily reduced in size, and a manufacturing method for the same.

Fourth Embodiment

Figure 24:
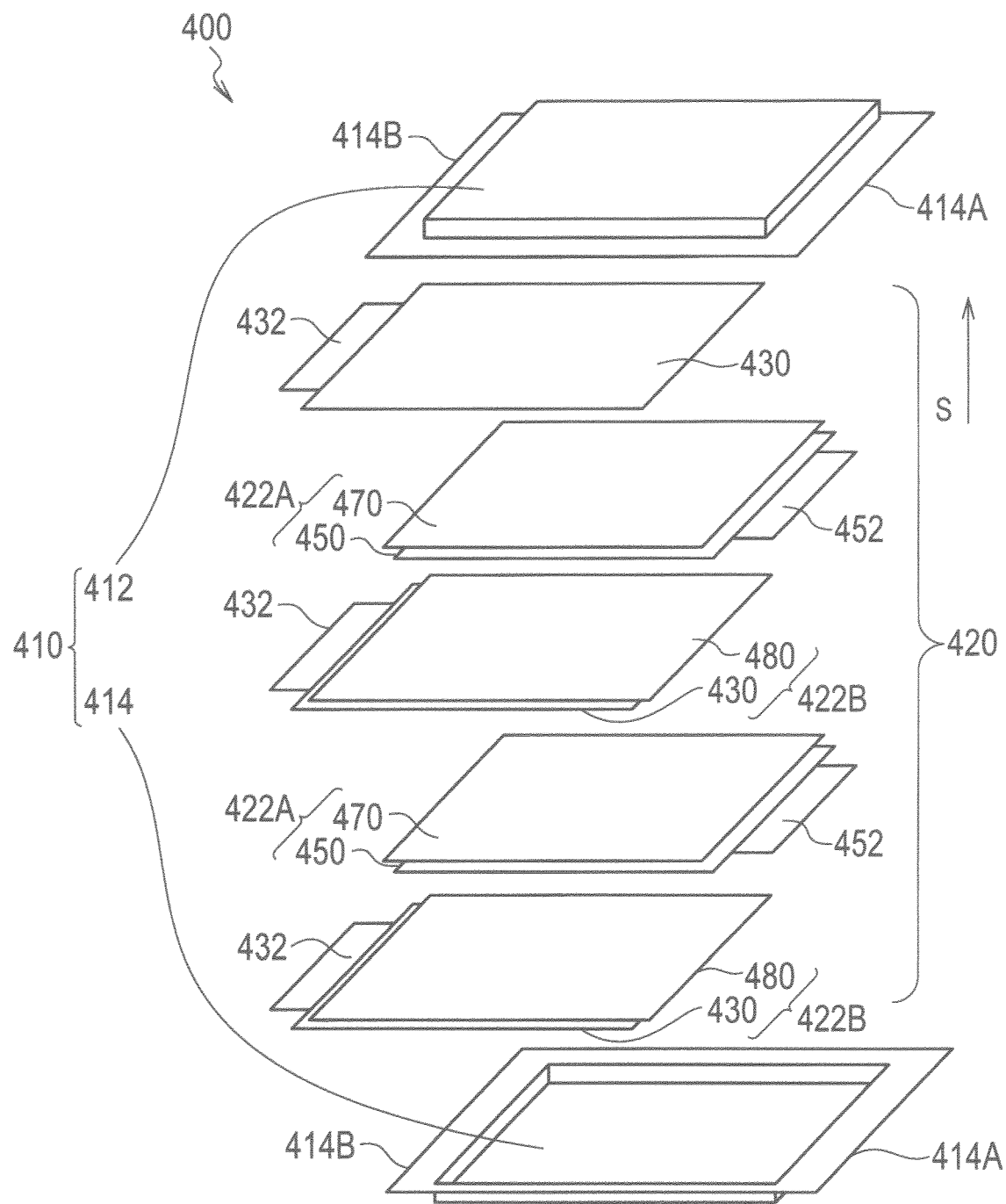
FIG. 24 is an exploded perspective view for explaining the laminated cell in a fourth embodiment.
Figure 25:
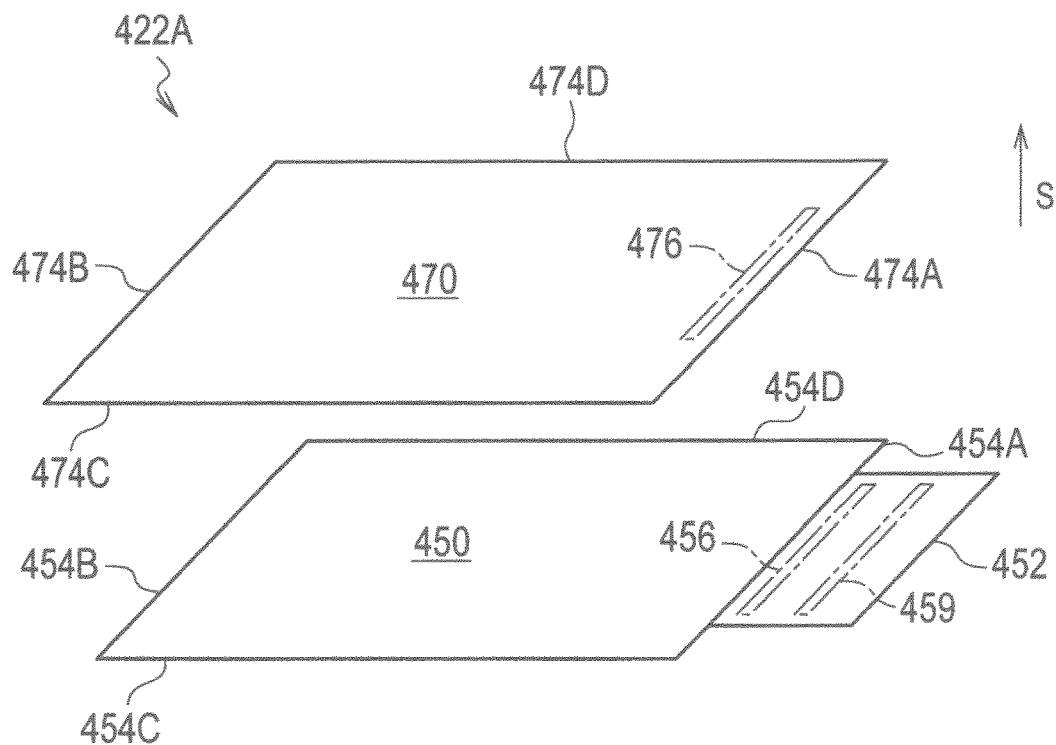
FIG. 25 is an exploded perspective view for explaining a first sub-assembly shown in FIG. 24.
Figure 26:
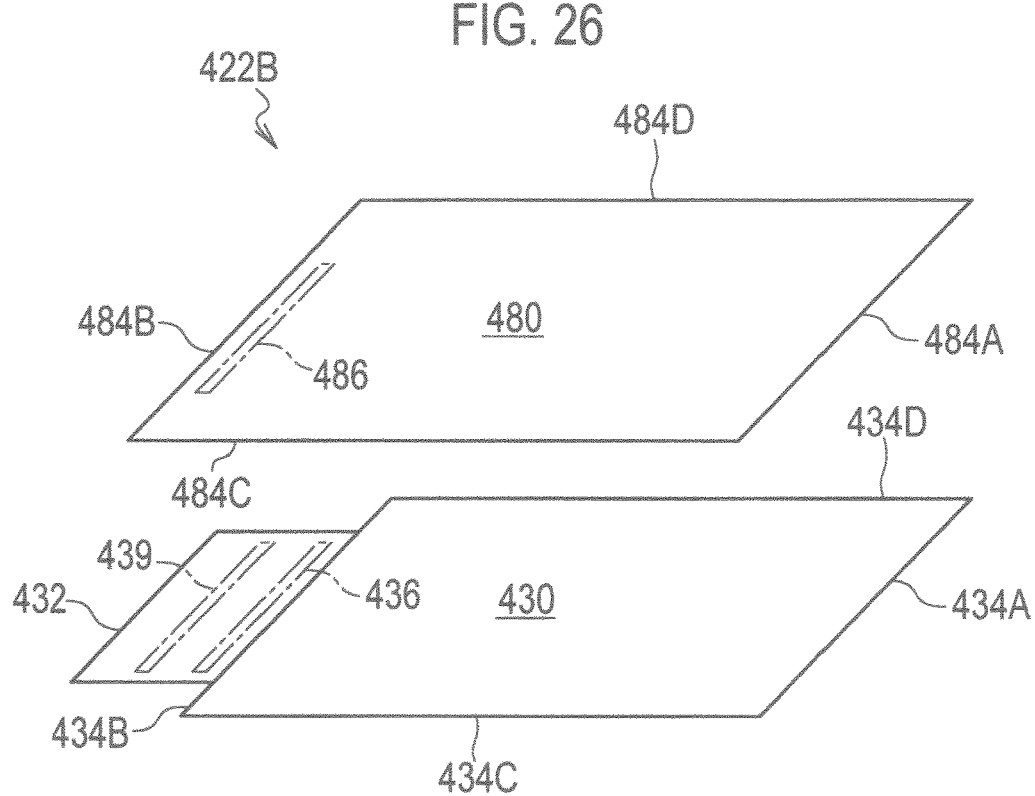
FIG. 26 is an exploded perspective view for explaining a second sub-assembly shown in FIG. 24.

Next, a laminated cell in a fourth embodiment is described. FIG. 24 is an exploded perspective view for explaining the laminated cell in the fourth embodiment. FIG. 25 is an exploded perspective view for explaining a first sub-assembly shown in FIG. 24. FIG. 26 is an exploded perspective view for explaining a second sub-assembly shown in FIG. 24.

The fourth embodiment generally differs from the third embodiment in the configurations of current collecting portions of negative electrodes and positive electrodes. Specifically, as shown in FIG. 24, a laminated cell 400 in the fourth embodiment has: an exterior member 410 formed of an upper portion 412 and a lower portion 414; and a laminated body 420 forming a cell main body. Note that reference numerals 414A and 414B respectively denote a front edge portion and a rear edge portion of the exterior member 410.

As shown in FIG. 24, the laminated body 420 is formed by sequentially stacking first sub-assemblies 422A and second sub-assemblies 422B below a negative electrode 430. As shown in FIG. 25, each first sub-assembly 422A has a positive electrode 450 and a separator 470. As shown in FIG. 26, each second sub-assembly 422B has the negative electrode 430 and a separator 480. The separator 470 and the separator 480 are disposed respectively on one side of the positive electrode 450 and one side of the negative electrode 430 in a stacking direction S.

As shown in FIG. 26, a negative-electrode current collecting portion 432 of the negative electrode 430 is disposed substantially at the center of a rear edge portion 434B. As shown in FIG. 25, a positive-electrode current collecting portion 452 of the positive electrode 450 is disposed substantially at the center of a front edge portion 454A. Since the rear edge portion 434B of the negative electrode 430 and the front edge portion 454A of the positive electrode 450 are opposite and spaced away from each other, the positive-electrode current collecting portion 452 and the negative-electrode current collecting portion 432 do not overlap each other in the stacking direction S. Note that reference numerals 434A and 434C, 434D denote a front edge portion and side edge portions of the negative electrode 430. Moreover, reference numerals 454B and 454C, 454D denote a rear edge portion and side edge portions of the positive electrode 450.

As shown in FIG. 25, each first sub-assembly 422A is formed by bonding a front edge portion 474A of the separator 470 to a resin member (see reference numeral 390 in FIG. 21) bonded to one surface of the positive electrode 450 in the stacking direction S.

In other words, the positive electrode 450 has the front edge portion 454A whose one surface in the stacking direction S is bonded with the resin member, and the separator 470 has the front edge portion 474A bonded to the resin member. Since the positive electrode 450 and the separator 470 are integrated, misalignment in the stacking work can be easily suppressed. Moreover, the integration is performed by bonding, via the resin member, the front edge portion 454A (a bonding region 456) which is located on the one surface of the positive electrode 450 and the front edge portion 474A (a bonding region 476) in the separator 470 which is on the side facing the one surface of the positive electrode 450. Accordingly, effects on the sizes of the positive electrode 450 and the separator 470 are small.

Moreover, as shown in FIG. 26, each second sub-assembly 422B is formed by bonding a rear edge portion 484B of the separator 480 to the resin member (see reference numeral 390 of FIG. 23) bonded to one surface of the negative electrode 430 in the stacking direction S.

In other words, the negative electrode 430 has the rear edge portion 434B whose one surface in the stacking direction S is bonded with the resin member, and the separator 480 has the rear edge portion 484B bonded to the resin member. Since the negative electrode 430 and the separator 480 are integrated, misalignment in the stacking work can be easily suppressed. Moreover, the integration is performed by bonding, via the resin member, the rear edge portion 434B (a bonding region 436) which is located on the one surface of the negative electrode 430 and the rear edge portion 484B (a bonding region 486) in the separator 480 which is on the side facing the one surface of the negative electrode 430. Accordingly, effects on the sizes of the negative electrode 430 and the separator 480 are small.

Note that reference numeral 439 denotes a bonding region of the negative-electrode current collecting portion 432 to the rear edge portion 414B of the exterior member 410. Moreover, reference numeral 459 denotes a bonding region of the positive-electrode current collecting portion 452 to the front edge portion 414A of the exterior member 410.

As described above, in the fourth embodiment, the configuration is such that the resin member (separator) is bonded only to one surface of each of the positive electrode and the negative electrode in the stacking direction, and the negative-electrode current collecting portion and the positive-electrode current collecting portion are disposed to be opposite and spaced away from each other. Accordingly, it is possible to provide a laminated cell which has excellent productivity and which can be easily reduced in size, and a manufacturing method for the same.

The present invention is not limited to the embodiments described above and various modifications can be made. For example, the laminated body can be formed in such a way that each sub-assembly is formed of the negative electrode and the separator, and the sub-assemblies and the positive electrodes are sequentially stacked.

Moreover, the present invention can be applied to a bipolar secondary cell. Furthermore, the modified examples 1 to 6 of the first embodiment and the modified examples 1 to 4 of the second embodiment can be appropriately applied to the third embodiment and the fourth embodiment.

The entire contents of Japanese Patent Application No. 2011-137704 (filed Jun. 21, 2011) and Japanese Patent Application No. 2012-036530 (filed Feb. 22, 2012) are incorporated herein by reference.

The contents of the present invention have been described above according to the embodiments. However, the present invention is not limited to these descriptions and it is apparent to those skilled in the art that various modifications a improvements can be made.

INDUSTRIAL APPLICABILITY

In the present invention, since the separators and at least one of the positive electrode and the negative electrode are integrated together, misalignment in the stacking work can be easily suppressed and the laminated cell has excellent productivity. Moreover, the integration is performed by bonding, via the resin member, the portion which is located on at least one of surfaces of the positive electrode or the negative electrode and the portion in each separator which is located on the side facing the at least one of surfaces. Accordingly, effects on the sizes of the positive electrode, the negative electrode, and the separators are small and the laminated cell can be easily reduced in size. In other words, it is possible to provide a laminated cell which has excellent productivity and which can be easily reduced in size, and a manufacturing method for the same.

REFERENCE SIGNS LIST 100, 200, 300, 400 laminated cell
110, 210, 310, 410 exterior member
120, 220, 320, 420 laminated body
130, 230, 330, 430 negative electrode
132, 232, 332, 432 negative-electrode current collecting portion
140, 340 negative-electrode current collector
145, 345 negative-electrode active material layer
150, 250, 350 450 positive electrode
152, 252, 352, 452 positive-electrode current collecting portion
160, 360 positive-electrode current collector
165, 365 positive-electrode active material layer
170, 180, 270, 280, 370, 380, 470, 480 separator
190, 390 resin member
S stacking direction

The invention claimed is:

1. A laminated cell comprising:
a laminated body formed by sequentially stacking a negative electrode, a first separator, a positive electrode, and a second separator, the negative electrode comprising a negative-electrode current collector having a negative-electrode active material layer disposed on opposing sides thereof, and the positive electrode comprising a positive-electrode current collector having a positive-electrode active material layer disposed on opposing sides thereof; and
one or more resin members that are electrically insulative, wherein
the negative-electrode current collector includes a current collecting portion that extends past a rear edge of the negative-electrode active material layer,
the positive-electrode current collector includes a current collecting portion that extends past a front edge of the positive-electrode active material layer,
a first side of the one or more resin members is disposed on a surface of the positive-electrode active material layer and a surface of the positive-electrode current collector,
the first side of the one or more resin members is bonded to the positive-electrode active material layer with an adhesive,
a second side of the one or more resin members, opposite to the first side of the one or more resin members, is bonded to the first separator or the second separator with an adhesive, and
the current collecting portion of the negative-electrode current collector does not overlap the current collecting portion of the positive-electrode current collector in a stacking direction of the laminated cell.

2. The laminated cell according to claim 1, wherein
both surfaces of the positive electrode in a stacking direction have portions to which the one or more resin members are bonded, and
the first and second separators have portions bonded to the one or more resin members on sides facing both of the surfaces.

3. The laminated cell according to claim 1, wherein the one or more resin members are disposed in at least a region in which an active material is disposed.

4. The laminated cell according to claim 1, wherein the one or more resin members have: an electrically insulative base member; and an adhesive disposed on both surfaces of the base member in the stacking direction.

5. The laminated cell according to claim 4, wherein the electrically insulative base member comprises a resin.

6. The laminated cell according to claim 5, wherein the resin comprises polypropylene, polyethylene, or polyamide.

7. The laminated cell according to claim 4, wherein the adhesive comprises synthetic rubber, butyl rubber, synthetic resin, or acryl.

8. The laminated cell according to claim 1, wherein the one or more resin members comprises a double-sided adhesive tape.

9. The laminated cell according to claim 1, wherein the one or more resin members are disposed on both the surface of the positive-electrode active material layer and the surface of the current collecting portion of the positive-electrode current collector.

10. The laminated cell according to claim 1, wherein the one or more resin members are disposed on both the surface of the negative-electrode active material layer and the surface of the current collecting portion of the negative-electrode current collector.

11. The laminated cell according to claim 1, further comprising an exterior member formed of an upper portion and a lower portion,
wherein the laminated body is provided between the upper portion and the lower portion.

12. The laminated cell according to claim 11, further comprising an additional resin member that is electrically insulative,
wherein a first side of the additional resin member is disposed on a surface of the current collecting portion of the positive-electrode current collector, and a second side of the additional resin member, opposite to the first side of the additional resin member, is bonded to the upper portion of the exterior member.

13. A method for manufacturing a laminated cell having a laminated body formed by sequentially stacking a negative electrode, a first separator, a positive electrode, and a second separator, the negative electrode comprising a negative-electrode current collector having a negative-electrode active material layer disposed on opposing sides thereof, and the positive electrode comprising a positive-electrode current collector having a positive-electrode active material layer disposed on opposing sides thereof, the method comprising:
- disposing a first side of one or more resin members on a surface of the positive-electrode active material layer and a surface of the positive-electrode current collector,
- bonding the first side of the one or more resin members to the positive-electrode active material layer with an adhesive,
- bonding the first separator or the second separator to a second side of the one or more resin members with an adhesive,
- wherein the one or more resin members are electrically insulative, and
- wherein a current collecting portion of the negative-electrode current collector extends past a rear edge of the negative-electrode active material layer, and a current collecting portion of the positive-electrode current collector extends past a front edge of the positive-electrode active material layer.

14. The method for manufacturing the laminated cell according to claim 13, further comprising bonding surfaces of the positive electrode in a stacking direction to the one or more resin members,
- wherein the first and second separators are bonded to the one or more resin members on sides facing the surfaces.

15. The method for manufacturing the laminated cell according to claim 13, wherein the one or more resin members are disposed in at least a region in which an active material is disposed.

16. The method for manufacturing the laminated cell according to claim 13, wherein the one or more resin members have: an electrically insulative base member; and an adhesive disposed on both surfaces of the base member in a stacking direction.

17. A laminated cell comprising:
- a laminated body formed by sequentially stacking a negative electrode, a first separator, a positive electrode, and a second separator, the negative electrode comprising a negative-electrode current collector having a negative-electrode active material layer disposed on opposing sides thereof, and the positive electrode comprising a positive-electrode current collector having a positive-electrode active material layer disposed on opposing sides thereof; and
- one or more resin members that are electrically insulative, wherein
- each of the negative-electrode current collector and the positive-electrode current collector includes a current collecting portion, the current collecting portion of the negative-electrode current collector extending past a rear edge of the negative-electrode active material layer, and the current collecting portion of the positive-electrode current collector extending past a front edge of the positive-electrode active material layer,
- a first side of the one or more resin members is disposed on a surface of the positive-electrode active material layer and a surface of the positive-electrode current collector,
- the first side of the one or more resin members is bonded to the positive-electrode active material layer with an adhesive, and
- a second side of the one or more resin members, opposite to the first side of the one or more resin members, is bonded to the first separator or the second separator with an adhesive.

* * * * *